United States Patent
Yang et al.

(10) Patent No.: US 12,512,781 B2
(45) Date of Patent: Dec. 30, 2025

(54) SOLAR MODULE ATTACHMENT DEVICES

(71) Applicant: PanelClaw, Inc., North Andover, MA (US)

(72) Inventors: Hanghai Yang, Andover, MA (US); Joseph Armano, Andover, MA (US); Colby Anderson Andresen, Lowell, MA (US)

(73) Assignee: PanelClaw, Inc., North Andover, MA (US)

( * ) Notice: Subject to any disclaimer, the term of this patent is extended or adjusted under 35 U.S.C. 154(b) by 81 days.

(21) Appl. No.: 18/244,887

(22) Filed: Sep. 11, 2023

(65) Prior Publication Data

US 2025/0088135 A1  Mar. 13, 2025

(51) Int. Cl.
*H02S 20/23* (2014.01)
(52) U.S. Cl.
CPC .................................. *H02S 20/23* (2014.12)
(58) Field of Classification Search
CPC . H02S 20/23; F24S 2025/6004; F24S 25/634; F24S 25/632; Y02E 10/47; Y02E 10/50
USPC ........................................................ 136/251
See application file for complete search history.

(56) References Cited

U.S. PATENT DOCUMENTS

| | | | |
|---|---|---|---|
| 8,894,424 B2 | 11/2014 | DuPont | |
| 9,249,995 B2 | 2/2016 | Krantz et al. | |
| 10,202,995 B2 | 2/2019 | Stickelberger et al. | |
| 10,240,820 B2 | 3/2019 | Ash et al. | |
| 10,873,288 B2 | 12/2020 | West et al. | |
| 11,264,941 B1 | 3/2022 | Carless | |
| 2016/0282018 A1* | 9/2016 | Ash | F24S 25/636 |
| 2019/0222169 A1* | 7/2019 | Yang | F24S 25/30 |
| 2020/0228050 A1 | 7/2020 | McPheeters et al. | |

FOREIGN PATENT DOCUMENTS

| | | |
|---|---|---|
| DE | 102011050856 A1 | 12/2012 |
| WO | 2014008085 A1 | 1/2014 |
| WO | 2021195313 A1 | 9/2021 |

* cited by examiner

*Primary Examiner* — Angelo Trivisonno
(74) *Attorney, Agent, or Firm* — The Webb Law Firm

(57) ABSTRACT

A module attachment device may include: a bracket coupled to a portion of a support structure, the bracket may include: opposing sidewalls, defining a space; and at least one wing, which may include a first portion extending from a first sidewall and a second portion extending from the first portion and at least partially overlapping the first portion; a seat rotatably coupled with the bracket and configured to support at least a portion of the solar panel module thereon; and a claw defining an opening. The opening may be configured to receive the seat and a portion of the solar panel module. The claw, the seat, and the portion of the solar panel module supported by the seat may be rotatable about the bracket. The space may be configured to receive the claw and the seat. Upon rotation, the second portion may be configured to support the solar panel module.

20 Claims, 25 Drawing Sheets

SOLAR MODULE ATTACHMENT DEVICES

BACKGROUND OF THE INVENTION

Field of the Invention

The present disclosure is related to attachment devices for mounting solar panel modules to a desired support structure.

Description of Related Art

Solar panel modules are often manufactured in the form of flat rigid plates. Solar panel modules include photovoltaic panels mounted to frames. The frames provide support to the panels and allow for the panels to ultimately be mounted or otherwise arranged at a desired location. To facilitate the performance of the function of generating electricity, solar panel modules may be mounted in an area exposed to the sun or other source of light. Often, solar panel modules are mounted at an angle from the horizontal so that they will more directly face the sun during peak daylight. In some applications, a number of solar modules are mounted together in an array in order to combine the power generation capabilities of the individual solar modules. Mounting systems for solar panel module arrays retain the solar modules in place by connecting the solar panel modules to one another and/or by attaching the frames to the mounting structure. Thus, there is a need for mounting devices that allow for solar panel modules to be easily and accurately mounted, either individually or within an array. When mounted, the devices must provide a resilient support surface the module can contact and provide adequate force to secure the solar panel module in its desired location, without having any features of the devices coming loose or otherwise disconnecting from the solar panel module.

SUMMARY OF THE INVENTION

In one embodiment or aspect, an attachment mechanism for securing a solar panel module to a support structure may include: a bracket coupled to a portion of the support structure, which may include: opposing sidewalls, defining a space therebetween; and at least one wing, the at least one wing may include a first portion extending from a first sidewall and a second portion extending from the first portion and at least partially overlapping the first portion; a seat rotatably coupled with the bracket and configured to support at least a portion of the solar panel module thereon; and a claw defining an opening. The opening may be configured to receive the seat and at least a portion of the solar panel module therein. The claw, the seat, and the at least a portion of the solar panel module may be supported by the seat are rotatable about the bracket. The space may be configured to receive the claw and the seat. Upon rotation, the second portion may be configured to support the solar panel module thereon.

The at least one wing may extend from the body such that the second portion is folded over the first portion. The second portion may include a rounded leading edge. The second portion may include a boding tooth that is configured to create an electrical connection with the at least a portion of the solar panel module. The at least one wing may include two wings, a first wing extending from the first sidewall and a second wing extending from the second sidewall.

The bracket may further include at least one fin. The claw may include an inner surface defining the opening, and an outer surface opposing the inner surface. Upon rotation, the outer surface of the claw may be configured to engage with the at least one fin to secure the claw, the seat, and the at least a portion of the solar panel module supported by the seat in a mounted position. At least a portion of the outer surface may be serrated, and upon rotation, the serrated portion of the outer surface may be configured to engage with the at least one fin. The claw may further include a seat jaw, configured to engage with the seat, and a module jaw opposing the seat jaw, the module jaw configured to engage with the at least a portion of the solar panel module, and the seat jaw and module jaw may define the opening. The module jaw and the seat jaw may both have a length extending in a first direction, the length of the seat jaw being longer than the length of the module jaw. The module jaw and the seat jaw may both have a width, extending in a second direction perpendicular to the first direction, the width of the module jaw being wider than the width of the seat jaw.

The seat may include a support flange extending from the seat surface and configured to support at least another portion of the solar panel module. The seat may include a channel extending from the seat surface, the channel configured to receive a portion of the claw therein. The channel may include a channel surface configured to contact the portion of the claw received within the channel. The attachment mechanism may include at least one fastener. The bracket and the seat may both define corresponding apertures configured to receive the at least one fastener, and the claw, the seat, and the at least a portion of the solar panel area configured to rotate about the at least one fastener. The bracket may include at least one mounting foot extending from the body, the at least one mounting foot being configured to secure the bracket to the support structure.

In some embodiments or aspects, an attachment mechanism for securing a solar panel module to a support structure may include: a bracket coupled to a portion of the support structure, which may include: opposing sidewalls defining a space therebetween; and at least one wing, which may include a first portion extending from a first sidewall and a second portion extending from the first portion and at least partially overlapping the first portion; a seat rotatably coupled with the bracket and configured to support at least a portion of the solar panel module thereon; and a claw, which may include: a seat jaw; a module jaw opposing the seat jaw and defining an opening therebetween; an inner surface; and an outer surface opposing the inner surface. The seat jaw may be configured to contact the seat and the module jaw is configured to contact the at least a portion of the solar panel module, thereby securing the seat and the at least a portion of the solar panel module within the opening. The claw, the seat, and the at least a portion of the solar panel module may be rotatable about the bracket. Upon rotation, the second portion of the at least one wing may be configured to support the solar panel module thereon.

The at least one wing may extend from the body such that the second portion is folded over the first portion. The second portion of the at least one wing may include a rounded leading edge. The second portion of the at least one wing may include a bonding tooth configured to create an electrical connection with the at least a portion of the solar panel module. The at least one wing may include two wings, a first wing extending from the first sidewall and a second wing extending from the second sidewall.

In some embodiments or aspects, the present disclosure can be characterized by the following clauses.

Clause 1. An attachment mechanism for securing a solar panel module to a support structure, the attachment mechanism comprising: a bracket coupled to a portion of the support structure, the bracket comprising: opposing sidewalls, defining a space therebetween; and at least one wing, the at least one wing comprising a first portion extending from a first sidewall and a second portion extending from the first portion and at least partially overlapping the first portion; a seat rotatably coupled with the bracket and configured to support at least a portion of the solar panel module thereon; and a claw defining an opening, wherein the opening is configured to receive the seat and at least a portion of the solar panel module therein, wherein the claw, the seat, and the at least a portion of the solar panel module supported by the seat are rotatable about the bracket, wherein the space is configured to receive the claw and the seat, wherein, upon rotation, the second portion is configured to support the solar panel module thereon.

Clause 2. The attachment mechanism of clause 1, wherein the at least one wing extends from the body such that the second portion is folded over the first portion.

Clause 3. The attachment mechanism of clause 1 or 2, wherein the second portion of the at least one wing comprises a rounded leading edge.

Clause 4. The attachment mechanism of any of clauses 1-3, wherein the second portion of the at least one wing comprises a bonding tooth, the bonding tooth configured to create an electrical connection with the at least a portion of the solar panel module.

Clause 5. The attachment mechanism of any of clauses 1-4, wherein the at least one wing comprises two wings, a first wing extending from the first sidewall and a second wing extending from the second sidewall.

Clause 6. The attachment mechanism of any of clauses 1-5, wherein the bracket further comprises at least one fin, and wherein the claw comprises: an inner surface defining the opening; and an outer surface opposing the inner surface, and wherein upon rotation, the outer surface of the claw is configured to engage with the at least one fin to secure the claw, the seat, and the at least a portion of the solar panel module supported by the seat in a mounted position.

Clause 7. The attachment mechanism of any of clauses 1-6, wherein at least a portion of the outer surface is serrated, and upon rotation, the serrated portion of the outer surface is configured to engage with the at least one fin.

Clause 8. The attachment mechanism of any of clauses 1-7, wherein the claw further comprises a seat jaw, configured to engage with the seat, and a module jaw opposing the seat jaw, the module jaw configured to engage with the at least a portion of the solar panel module, and wherein the seat jaw and the module jaw define the opening.

Clause 9. The attachment mechanism of any of clauses 1-8, wherein the module jaw and the seat jaw both have a length, extending in a first direction, the length of the seat jaw being longer than the length of the module jaw.

Clause 10. The attachment mechanism of any of clauses 1-9, wherein the module jaw and the seat jaw both have a width, extending in a second direction perpendicular to the first direction, the width of the module jaw being wider than the width of the seat jaw . . . .

Clause 11. The attachment mechanism of any of clauses 1-10, wherein the seat comprises a support flange extending from the seat surface and configured to support at least another portion of the solar panel module.

Clause 12. The attachment mechanism of any of clauses 1-11, wherein the seat comprises a channel extending from the seat surface, the channel configured to receive a portion of the claw therein.

Clause 13. The attachment mechanism of any of clauses 1-12, wherein the channel comprises a channel surface configured to contact the portion of the claw received within the channel.

Clause 14. The attachment mechanism of any of clauses 1-13, further comprising at least one fastener, wherein the bracket and the seat both define corresponding apertures configured to receive the at least one fastener, and the claw, the seat, and the at least a portion of the solar panel area configured to rotate about the at least one fastener.

Clause 15. The attachment mechanism of any of clauses 1-14, wherein the bracket comprises at least one mounting foot extending from the body, the at least one mounting foot being configured to secure the bracket to the support structure.

Clause 16. An attachment mechanism for securing a solar panel module to a support structure, the attachment mechanism comprising: a bracket coupled to a portion of the support structure, the bracket comprising: opposing sidewalls defining a space therebetween; and at least one wing, the at least one wing comprising a first portion extending from a first sidewall and a second portion extending from the first portion and at least partially overlapping the first portion; a seat rotatably coupled with the bracket and configured to support at least a portion of the solar panel module thereon; and a claw comprising: a seat jaw; a module jaw opposing the seat jaw and defining an opening therebetween; an inner surface; and an outer surface opposing the inner surface, wherein the seat jaw is configured to contact the seat and the module jaw is configured to contact the at least a portion of the solar panel module, thereby securing the seat and the at least a portion of the solar panel module within the opening, wherein the claw, the seat, and the at least a portion of the solar panel module are rotatable about the bracket, and wherein, upon rotation, the second portion of the at least one wing is configured to support the solar panel module thereon.

Clause 17. The attachment mechanism of clause 16, wherein the at least one wing extends from the body such that the second portion is folded over the first portion.

Clause 18. The attachment mechanism of clause 16 or 17, wherein the second portion of the at least one wing comprises a rounded leading edge.

Clause 19. The attachment mechanism of any of clauses 16-18, wherein the second portion of the at least one wing comprises a bonding tooth, the bonding tooth configured to create an electrical connection with the at least a portion of the solar panel module.

Clause 20. The attachment mechanism of any of clauses 16-19, wherein the at least one wing comprises two wings, a first wing extending from the first sidewall and a second wing extending from the second sidewall.

Clause 21. An attachment mechanism for securing a solar panel module to a support structure, the attachment mechanism comprising: a tilt arm defining a receiving space and a slot, the slot configured to receive at least a portion of the solar panel module therein; and a bracket configured to be received within the receiving space, the bracket comprising: a body; at least one retaining tooth extending from a first end of the body and into the slot, the at least one retaining tooth configured to retain the at least a portion of the solar panel within the slot; and a stopper extending from a second end of the body and configured to contact the body to prevent overrotation of the bracket.

Clause 22. The attachment mechanism of clause 21, wherein the bracket comprises flanges extending from opposing sides of the body in a direction away from the receiving space, the flanges comprising at least one tab configured to contact the stopper.

Clause 23. The attachment mechanism of clause 21 or 22, wherein the at least one tab comprises two tabs defining a notch therebetween, the notch configured to receive at least a portion of the stopper therein.

Clause 24. The attachment mechanism of any of clauses 21-23, wherein a first tab is located closer to the receiving space than a second tab, the first tab being longer than the second tab and configured to contact the at least a portion of the stopper.

Clause 25. The attachment mechanism of any of clauses 21-24, wherein the stopper comprises an action tab configured to contact the first tab and be received within the notch to prevent excess deformation of the bracket.

Clause 26. The attachment mechanism of any of clauses 21-25, wherein the stopper extends between the body and the action tab such that at least a portion of the stopper is folded over itself.

Clause 27. The attachment mechanism of any of clauses 21-26, wherein the flanges both comprise an aperture configured to receive a fastener therethrough, the fastener being configured to rotatably connect the bracket to the tilt arm.

Clause 28. The attachment mechanism of any of clauses 21-27, wherein the tilt arm defines opposing apertures corresponding to the apertures of the bracket, the corresponding apertures configured to receive a fastener therethrough.

Clause 29. The attachment mechanism of any of clauses 21-28, wherein the body defines at least one gap proximate the at least one retaining tooth.

Clause 30. The attachment mechanism of any of clauses 21-29, wherein the at least one gap comprises an angled portion and a straight portion extending from the angled portion.

Clause 31. The attachment mechanism of any of clauses 21-30, wherein the at least one gap comprises two gaps defined on opposing sides of the at least one retaining tooth.

Clause 32. The attachment mechanism of any of clauses 21-31, wherein the body comprises a rounded portion configured to extend into the receiving space.

Clause 33. The attachment mechanism of any of clauses 21-32, wherein the bracket further comprises at least one locking tooth extending from the body, the at least one locking tooth configured to secure the bracket to the tilt arm in an engaged position.

Clause 34. The attachment mechanism of any of clauses 21-33, wherein the bracket comprises a retaining portion extending from the body, and wherein the at least one retaining tooth extends from the retaining portion.

Clause 35. The attachment mechanism of any of clauses 21-34, wherein the at least one retaining tooth comprises two retaining teeth located on opposing ends of the retaining portion.

Clause 36. An attachment mechanism for securing a solar panel module to a support structure, the attachment mechanism comprising: a tilt arm defining a receiving space and a slot, the slot configured to receive at least a portion of the solar panel module therein; and a bracket configured to be at least partially received within the receiving space, the bracket comprising: a body comprising: a back; a rounded portion extending from the back and configured to extend into the receiving space; and a folded portion extending from the rounded portion; a retaining portion extending from the back, the retaining portion comprising at least one retaining tooth extending into the slot, the at least one retaining tooth configured to retain the at least a portion of the solar panel within the slot; and a stopper extending from the bent portion and configured to contact the body to prevent deformation of the bracket within the receiving space.

Clause 37. The attachment mechanism of clause 36, wherein the bracket comprises flanges extending from the back, the flanges comprising at least one tab configured to contact the stopper.

Clause 38. The attachment mechanism of clause 36 or 37, wherein the at least one tab comprises two tabs defining a notch therebetween, the notch configured to receive at least a portion of the stopper therein when the stopper is engaged to displace the bracket within the receiving space.

Clause 39. The attachment mechanism of any of clauses 36-38, wherein the bracket defines at least one slot proximate the retaining portion, and wherein a first portion of the at least one slot is defined between the back and the retaining portion, and a second portion of the at least one slot is defined in the back.

Clause 40. The attachment mechanism of any of clauses 36-39, wherein the bracket further comprises at least one locking tooth extending from the rounded portion, the at least one locking tooth configured to secure the bracket to the tilt arm in the engaged position, thereby preventing rotation of the bracket relative to the tilt arm.

Clause 41. An attachment mechanism for securing a solar panel module to a support structure, the attachment mechanism comprising: a tilt arm defining a receiving space and at least one slot, the at least one slot configured to receive at least a portion of the solar panel module therein; and a bracket configured to be received in the receiving space, the bracket comprising: a body; at least one retaining tooth extending from a first end of the body; a folded portion extending from a second end of the body; and at least one locking tooth extending from a portion of the body located between the first end and the second end, wherein the bracket is configured to rotate within the receiving space between a disengaged position and an engaged position, wherein, in the disengaged position, at least a portion of the at least one locking tooth is located outside of the receiving space, and wherein, in the engaged position, the at least one locking tooth is located within the receiving space and configured to engage with the tilt arm, and the at least one retaining tooth is configured to engage with the at least a portion of the solar panel module, thereby securing the solar panel module within the slot.

Clause 42. The attachment mechanism of clause 41, wherein actuation of the folded portion rotates the bracket from the disengaged position to the engaged position and from the engaged position to the disengaged position.

Clause 43. The attachment mechanism of clause 41 or 42, wherein a stopper is configured to contact a portion of the body to prevent deformation of the folded portion when rotating the bracket from the engaged to the disengaged position.

Clause 44. A bracket for mounting a solar panel module to a tilt arm, the bracket comprising: a body; and at least one retaining tooth extending from a first end of the body, wherein the bracket is configured to rotate relative to the tilt arm between a disengaged position and an engaged position, where the at least one retaining tooth is configured to secure at least a portion of the solar panel module to the tilt arm.

Clause 45. The bracket of clause 44, wherein the bracket further comprises at least one locking tooth extending from a portion of the body, and wherein, in the engaged position, the at least one locking tooth is configured to secure the bracket to the tilt arm in the engaged position and to prevent over rotation of the bracket relative to the tilt arm.

Clause 46. The bracket of clause 44 or 45, wherein the bracket further comprises a folded portion extending from a second end of the body, the folded portion being configured to actuate rotation of the bracket from the disengaged position to the engaged position and from the engaged position to the disengaged position.

Clause 47. The bracket of any of clauses 44-46, wherein the stopper is configured to contact a portion of the body to prevent overrotation of the stopper when rotating the bracket from the engaged position to the disengaged position.

BRIEF DESCRIPTION OF THE DRAWING(S)

DESCRIPTION OF THE INVENTION

Figure 1:
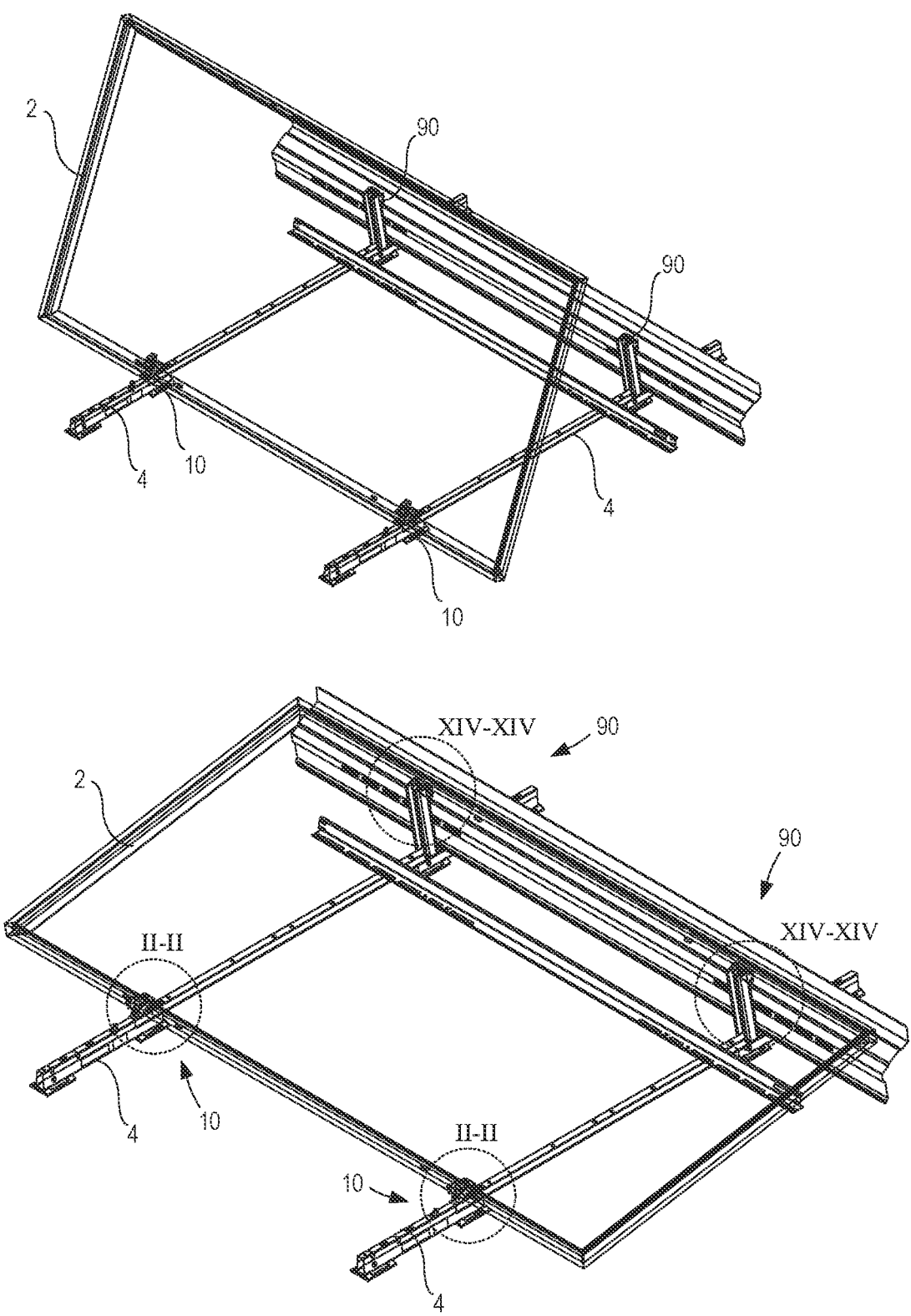
FIG. 1 is a perspective view, showing the mounting of a solar panel module using the attachment devices according to one embodiment or aspect of the disclosure.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The present disclosure is directed to attachment mechanisms 10, 90 for mounting a solar panel module 2 to a support structure 4. The solar panel module 2 includes at least a photovoltaic panel P and a frame F securing the photovoltaic panel P. The frame F is typically the feature mounted to the support structure 4. The support structure 4 can be any mounting features used to connect solar panel modules 2 to a surface. The support structure 4 can be rails or other mounting features. As shown, the support structure 4 is applied to a flat surface, such as the roof of an industrial building, but the support structure 4 can be applied to other surfaces, such as sloped roofs and ground mounted systems such as on landfills and other open spaces and parking structures whether the ground is flat or inclined. The support structure 4 can have multiple rails or mounting features so that multiple solar panel modules 2 can be mounted in a solar panel array.

FIG. 1 shows the process of connecting the solar panel module 2 to the support structure 4. The solar panel module 2 is mounted so that it is tilted relative to the support structure 4. The tilt defines a low side, where the frame F is proximate to the support structure 4, and a high side, where the frame F is located a distance away from the support structure 4. The frame F is secured to the support structure at the low side via the low side attachment mechanism 10. The frame F is secured to the support structure 4 at the high side via a high side attachment mechanism 90. The part of the frame F secured at the high side is a greater distance away from the support structure 4 relative to the part of the frame F secured at the low side. The low side attachment mechanism 10 is identified in circle II-II and is used to secure the solar panel module 2 to the support structure 4 at the low side. The high side attachment mechanism 90 is identified in circle XIV-XIV and is used to secure the solar panel module 2 to the support structure 4 at the high side. To space the solar panel module 2 from the support structure 4 at the high side, a tilt arm 92 is used. The tilt arm 92 connects to the support structure 4. Part or all of the tilt arm 92 may be considered to be part of the high side attachment mechanism 90. The relationships between the support structure 4, the tilt arm 92, and the high side attachment mechanism 90 will be discussed in greater detail below. Both the low side attachment mechanism 10 and the high side attachment mechanism 90 are arranged to support the solar panel module 2 at an angle relative to the support structure 4 and/or the surface on which the support structure is mounted. In some embodiments, the solar panel module 2 may be arranged flat relative to the support structure 4, meaning the solar panel module 2 experiences no tilt. In other embodiments, the solar panel module 2 may be tilted at an angle from 0-15 degrees. If desired, the solar panel module 2 may be tilted at an even greater angle relative to the support structure 4. In some embodiments the tilt arm 92 may define this angle relative to the support structure 4. In other embodiments, parts of the low side attachment mechanism 10 may define this angle. In other embodiments, both the tilt arm 92 and the low side attachment mechanism 10 may be angled to create the desired tilt angle of the solar panel module 2.

Figure 2A:
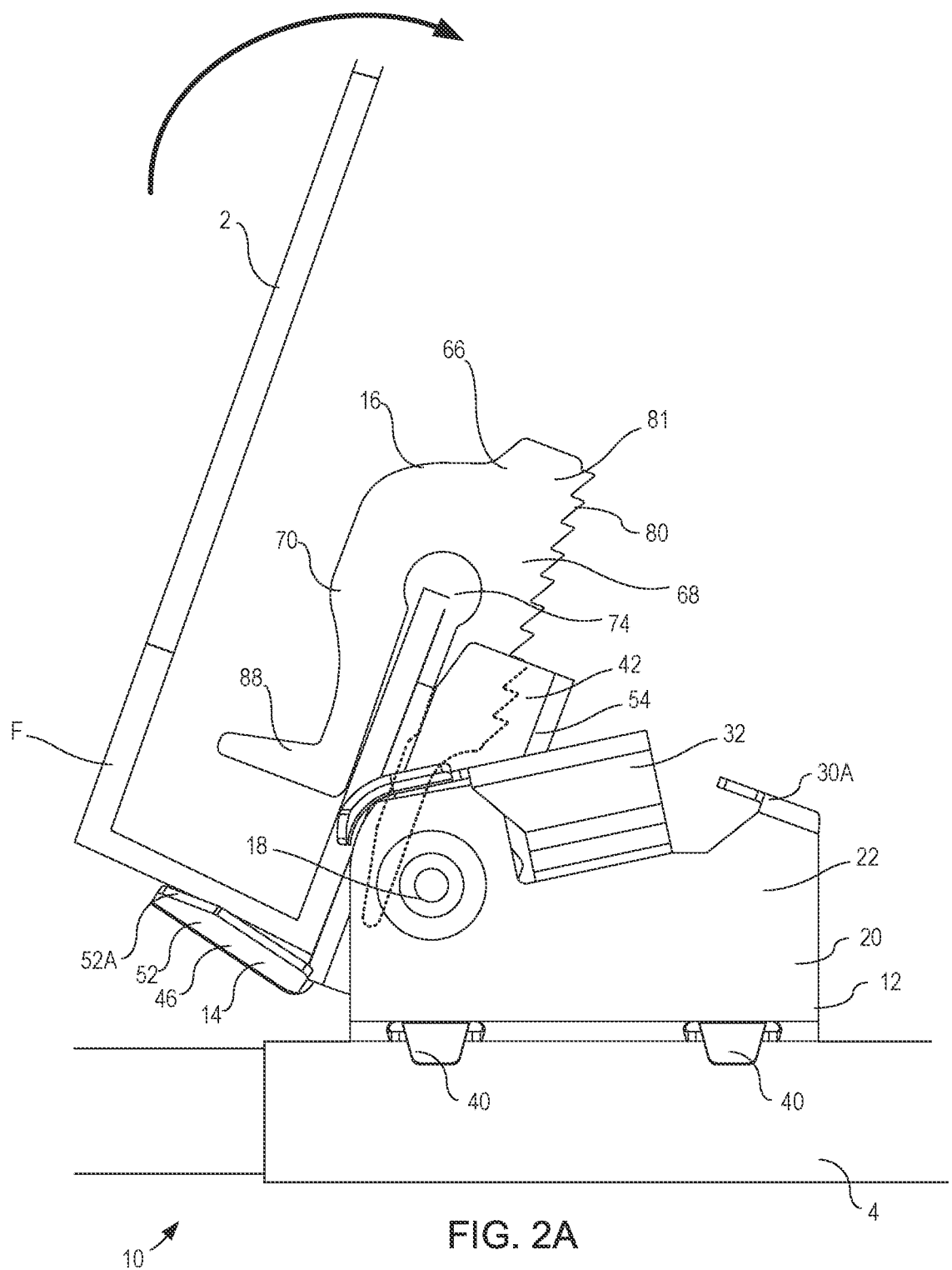
FIG. 2A is a side view of low side attachment devices shown in circle II-II in FIG. 1.
Figure 2B:
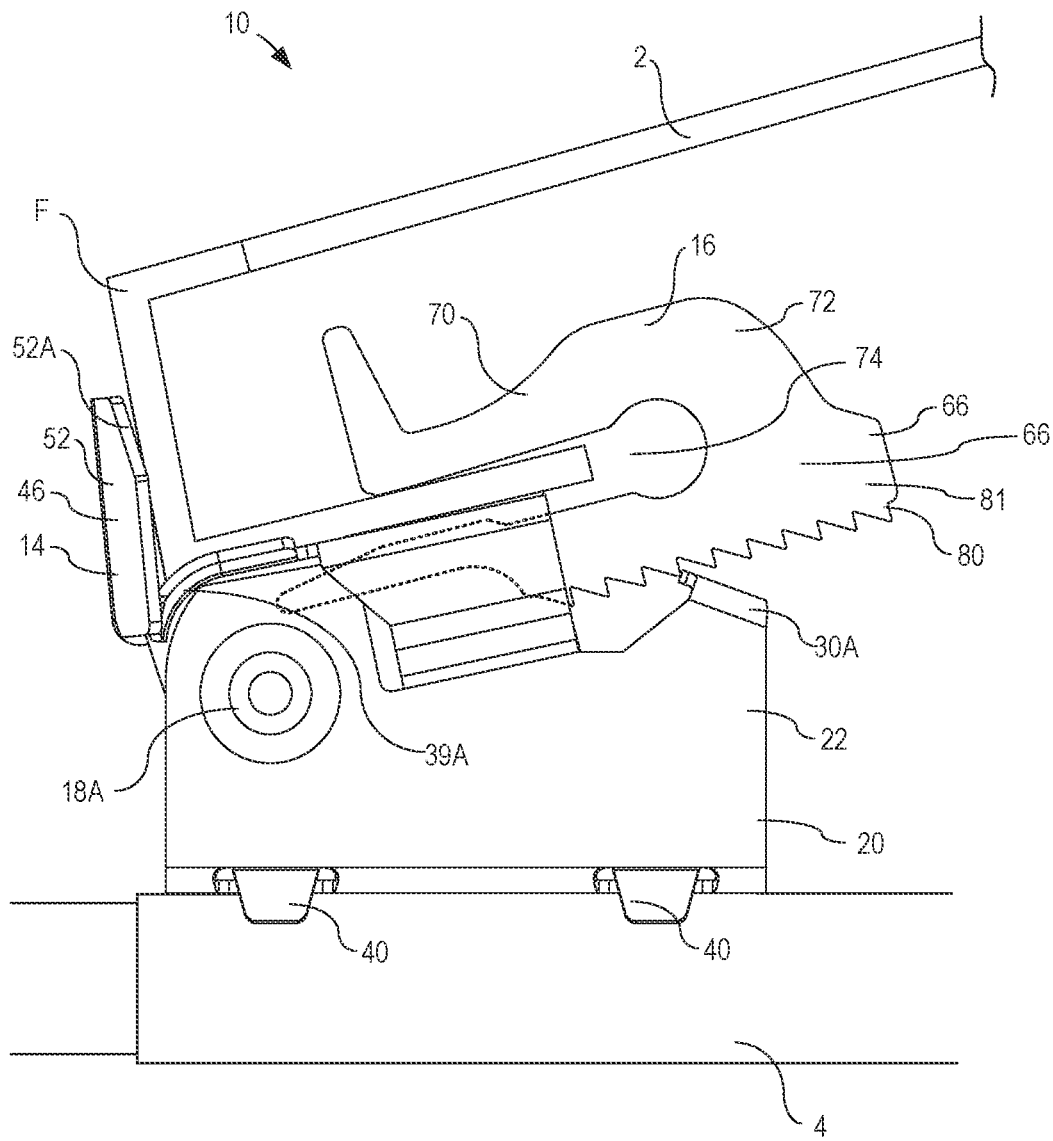
FIG. 2B is another side view of the low side attachment devices of FIG. 2A.

With reference to FIGS. 2A-13, the low side attachment mechanism 10 and its associated features are shown. The low side attachment mechanism 10 includes a bracket 12 that connects to the support structure 4, a seat 14 that at least partially fits within the bracket 12, and a claw 16. A fastener 18 connects the seat 14 to the bracket 12, so that the seat 14 is rotatable relative to the bracket 12. As shown, the fasteners 18 are rivets, but other fastening mechanisms such as pins, screws, or clamps may be used. The claw 16 connects to the seat 14, so that it also rotates within the bracket 12 during installation of the solar panel module 2. This rotation is shown in FIGS. 2A and 2B and is used to mount the solar panel module 2 to the support structure 4 via the low side attachment 10. Generally, the frame F of the solar panel module 2 is placed on the seat 14. One part of the frame F and one part of the seat 14 contact each other and are received within the claw 16, thereby connecting the frame F to the seat 14. After the claw 16 is fit about the frame F and seat 14, the solar panel module 2, seat 14, and claw 16 are rotated about the fastener 18, until these features are placed in their desired location where the solar panel module 2 is tilted at its desired angle as discussed above. The desired location can be determined by the engagement of the solar panel module 2 with the high side attachment mechanism 90 or contact occurring between the claw 16 and the bracket 12 and/or the solar panel frame F and the bracket 12, as will be discussed in greater detail below. This engagement and/or contact stops the rotation and secures the solar panel module 2 in a desired position relative to the support structure 4. The specific features of the low side attachment 10 that allow for this operation will now be described.

Figure 3:
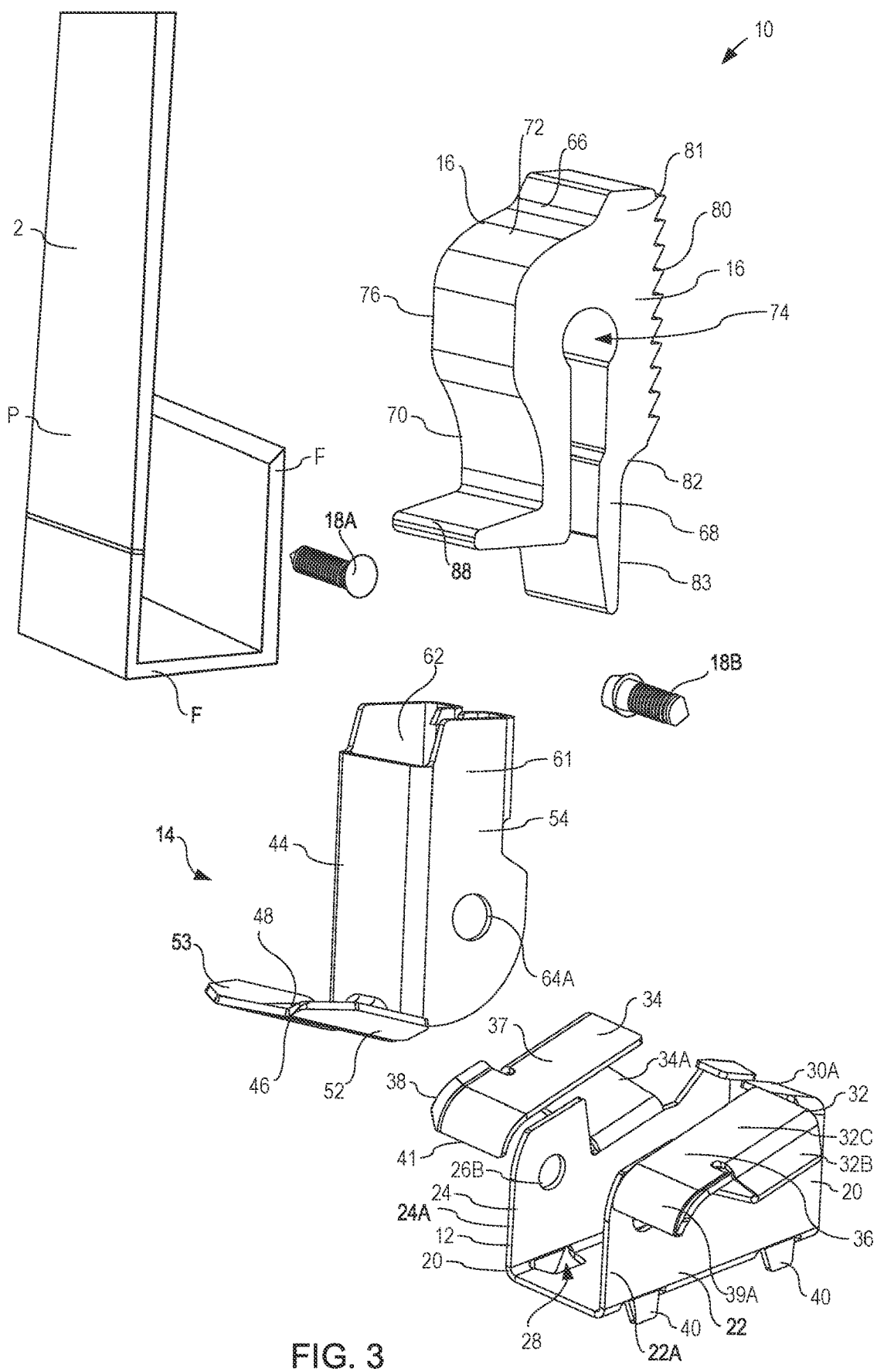
FIG. 3 is an exploded view of the low side attachment devices of FIGS. 2A and 2B.
Figure 4:
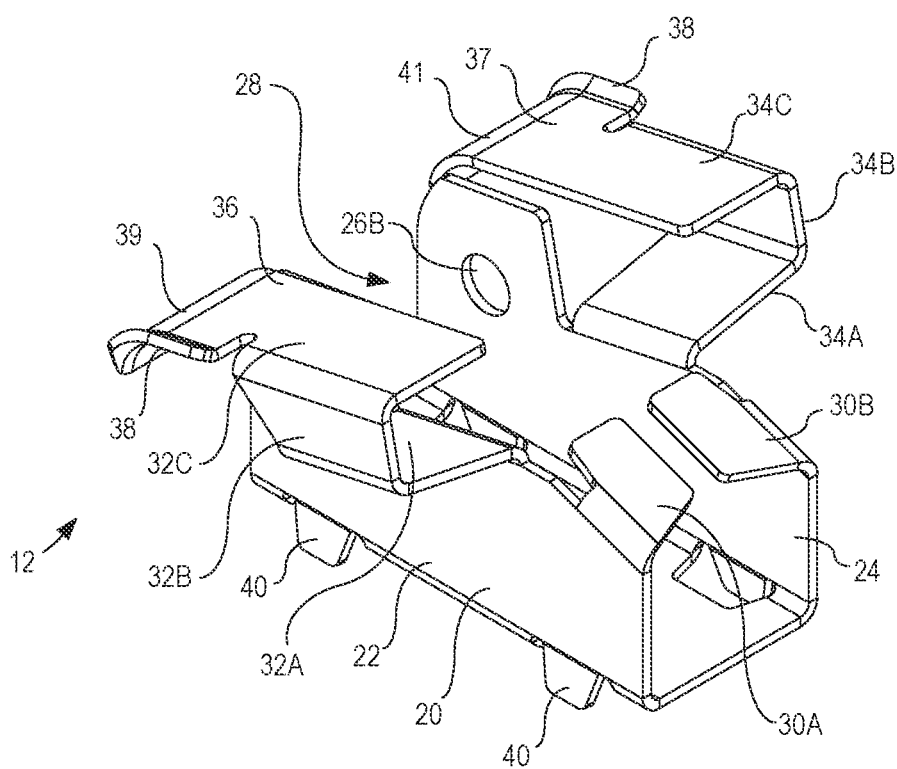
FIG. 4 is a perspective view of a bracket of the low side attachment devices of FIGS. 2A and 2B.
Figure 5:
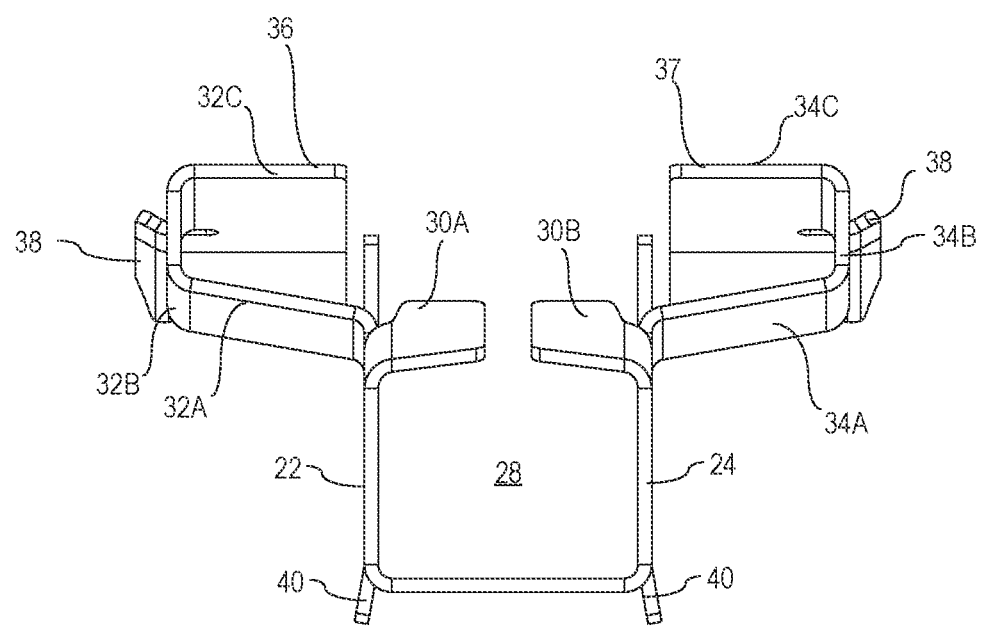
FIG. 5 is a back view of the bracket of FIG. 4.
Figure 6:
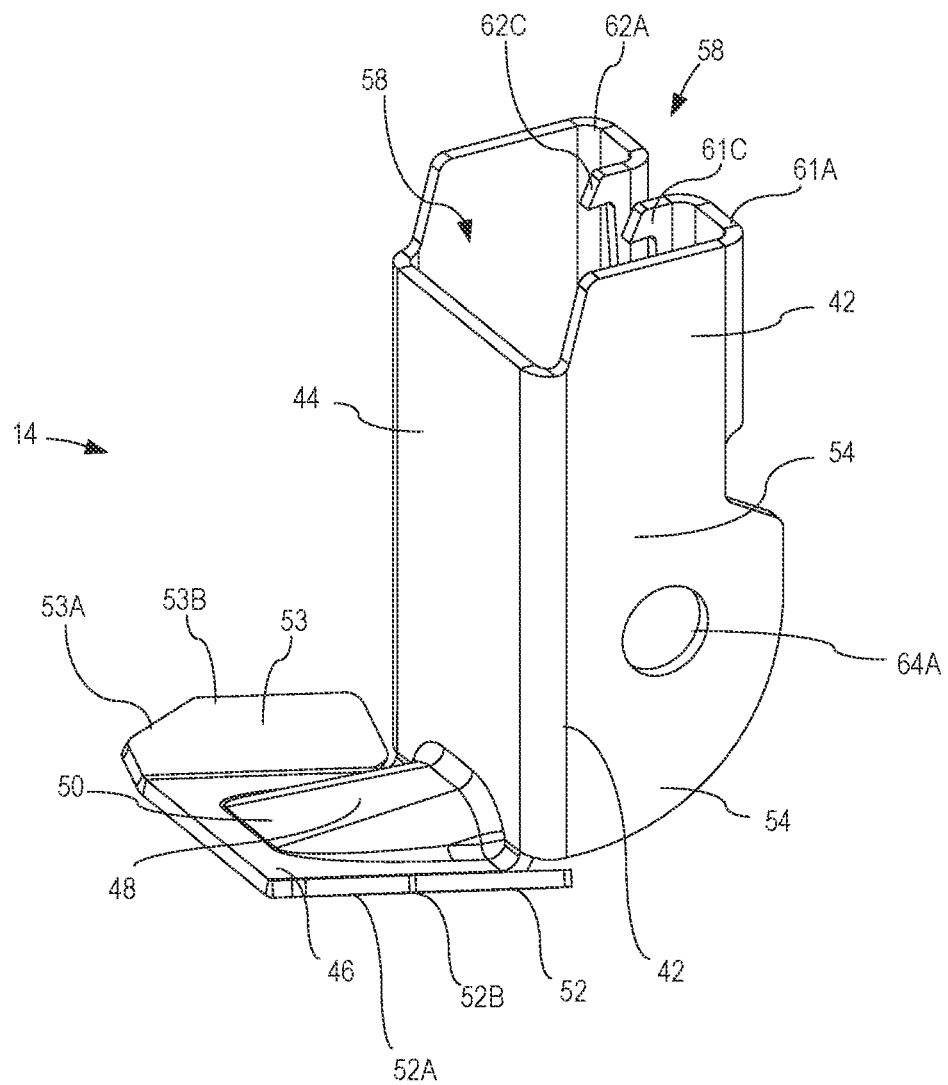
FIG. 6 is a perspective view of a seat of the low side attachment devices of FIG. 2.
Figure 7:
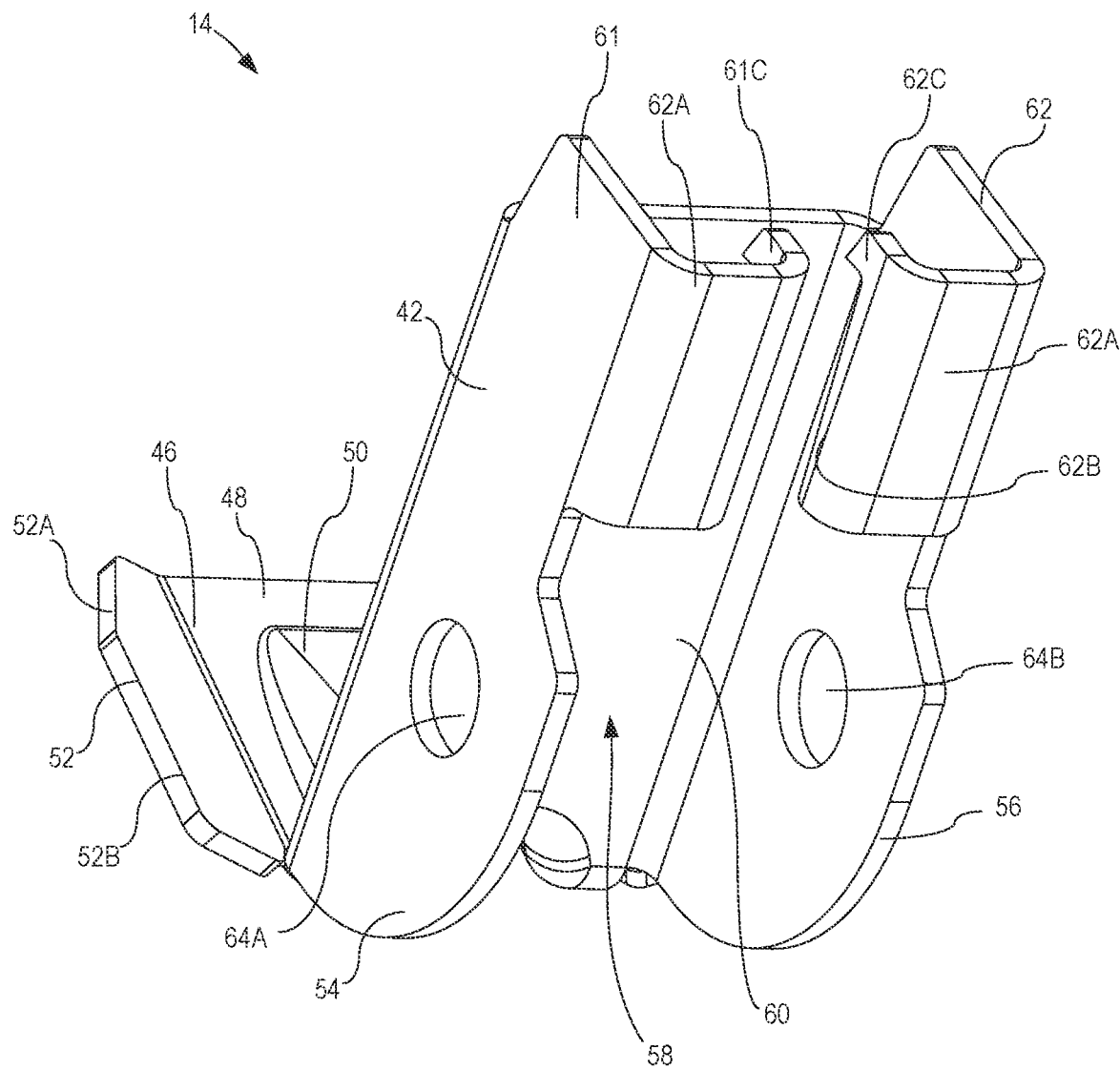
FIG. 7 is another perspective view of the seat of FIG. 6.
Figure 8:
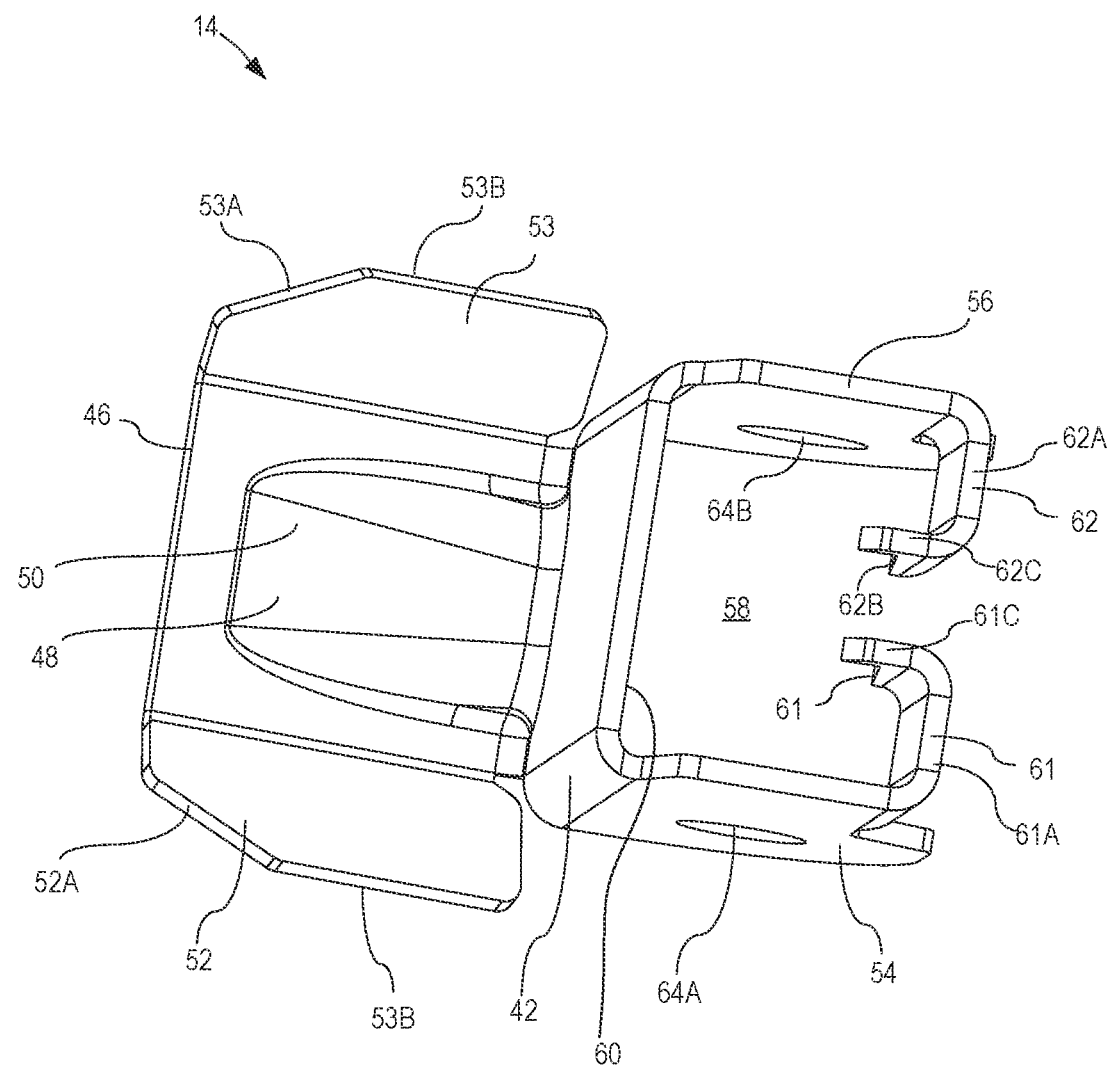
FIG. 8 is a top view of the seat of FIG. 6.

With reference to FIGS. 3-5, the bracket 12 is shown. The bracket 12 includes a body 20 that has sidewalls 22, 24 extending along opposing sides of the body 20. The sidewalls 22, 24 each define an aperture 26A, 26B that receive the fastener 18. As shown, sidewall 22 defines aperture 26A, and sidewall 24 defines aperture 26B. The sidewalls 22, 24 define a receiving space 28 therebetween. The receiving space at least partially receives the seat 14 and claw 16, so that each of these parts can rotate about the body 20. Extending from the sidewalls 22, 24 at an end of the body 20 are fins 30A, 30B. The fins 30A, 30B extend from the end of the body 20 opposite the end where the apertures 26A, 26B are located. Fin 30A extends from sidewall 22, and fin 30B extends from sidewall 24. The fins 30A, 30B are angled upward relative to the sidewalls 22, 24 and the receiving space 28. The fins 30A, 30B are configured to engage with the claw 16 upon its rotation, stopping the rotation of the claw 16, frame F, and seat 14, so that the solar panel module 2 is secured to the low side attachment. The angle formed between the fins 30A, 30B and the sidewalls 22, 24 and/or receiving space 28 can be chosen so that the solar panel module 2 is secured at a desired angle relative to the support structure 4. The angle of contact between the fins 30A. 30B and the claw 16 after rotation of the claw 16 can also be specified, so that the solar panel module 2 is secured at a desired angle relative to the support structure 4. The fins 30A, 30B include distal ends at the high point. These distal ends interact with the claw serrations 80 when the claw 16, frame F, and seat 14, are rotated into the installed position such that the distal ends of the fins 30A, 30B obstruct the movement of the claw 16 and prevent the removal of the claw 16 from the seat 14 and frame F.

Also extending from the sidewalls 22, 24 are wings 32, 34. Wing 32 extends from sidewall 22, and wing 34 extends from sidewall 24. The wings 32, 34 extend some distance away from their respective sidewalls 22, 24 and are at least partially folded over themselves. Starting at the points where the wings 32, 34 are directly connected to the sidewalls 22, 24, the wings 32, 34 include outwardly extending portions 32A, 34A that extend away from the sidewalls 22, 24. Upwardly extending portions 32B, 34B extend upward from an end of the outwardly extending portions 32A, 34A. Top portions 32C, 34C extend back in the direction of the sidewalls 22, 24 from an end of the upwardly extending portions 34B, 36B such that they overlap the outwardly extending portions 32A, 34A. The top portions 32C, 34C provide support surfaces 36, 37 on which the solar panel frames F can be supported when it is secured by the low side attachment 10. The top portions 32C, 34C are sized and shaped to avoid any interference with holes that are located along the solar panel frames F. The top portions 32C, 34C also extend along a length of the sidewalls 22, 24 in the direction of the apertures 26A, 26B. This length extends beyond the outwardly extending portions 32A, 34A and the upwardly extending portions 32B, 34B and terminates approximately adjacent to the end of the sidewalls 22, 24. As shown, the top portions 32C, 34C and support surfaces 36, 37 are angled relative to the surface on which the bracket 12 rests. This angle can be chosen so that the solar panel module 2 rests on the support surfaces 36, 37 at a desired angle relative to the bracket 12 and/or support structure 4. The portions of the wings 32A, 34A, 32B, 34B, 32C, 34C can also be arranged in a specific manner relative to the body 20 and sidewalls 22, 24, so that the solar panel module 2 is secured at its desired angle.

At the end or along the edge of the top portions 32C, 34C, bonding teeth 38A, 38B extend upward and are arranged to contact the frame F to create electrical bonding when the solar panel module 2 is secured in the low side attachment 10. The bonding teeth 38A, 38B may include an edge that penetrates the surface of and/or digs into the surface of frame F to facilitate the electrical connection between the bracket 12 and the solar panel module 2. The top portions 32C, 34C also have rounded ends 39, 41 adjacent to the sidewalls 22, 24. The rounded ends 39, 41 provide leading edges that serve as initial contact points for the frame F that prevents the frame F from being damaged during rotation. Like the top portions 32C, 34C, the rounded ends 39, 41 are also sized and shaped to avoid any interference that may occur from holes located along the solar panel frame F. At the bottom of the body 20, the bracket 12 includes feet 40 for securing and aligning the bracket 12 to the support structure 4. The feet 40 can fit about the support structure 4 or fit into corresponding slots (not shown) on the support structure 4 to secure the bracket 12 in place against the support structure.

With reference to FIGS. 3 and 6-8, the seat 14 is shown. The seat 14 includes a body 42 that has a seat surface 44 and a support flange 46 extending from an end of the body 42. The seat surface 44 is configured to contact and engage the frame F for mounting to the low side attachment 10. The support flange 46 defines a secondary seat surface 48 that also contacts and engages a portion of the frame F. The support flange 46 extends from the body 42 so that the secondary seat surface 48 extends from the seat surface 44 at an angle. The angle formed between the support flange 46 and the seat surface 44 may range from 75-90 degrees. This allows the frame F to sit within the seat 14 and to be more secured during the rotation discussed above.

The secondary seat surface 48 defines a bulge 50 that extends generally in the direction as the body 42. The bulge 50 is generally quadrilateral in shape and increases the strength of the support flange 46. The bulge 50 has one end located on the secondary seat surface 48 and a second end located proximate the seat surface 44. The end located proximate to the seat surface 44 may contact and extend along a portion of the width and/or length of the seat surface 44. Extending from the secondary seat surface 48 are flares 52, 53. The flares 52, 53 extend from the secondary seat surface 48 in the direction of the body 42, such that the flares 52, 53 define an obtuse angle with the flat portion of the secondary seat surface 48. The flares 52, 53 include two edges, an angled edge 52A, 53A and a straight edge 52B, 53B. The flares 52, 53 may be angled relative to the secondary seat surface 48 and the seat surface 44, so that their respective angled edges 52A, 53A form a substantially perpendicular angle with the seat surface 44. The arrangement of the bulge 50 and flares 52, 53 strengthens the support flange 46. The support flange 46, and specifically the angled edges 52A, 53A, support the module during initial placement on the seat, during rotation to the installed tilt and position, and resists loads especially from snow that urge the solar panel module 2 down the slope/tilt and into the seat support flange 46. The flares 52, 53 are also shaped to contact the ends 22A, 24A of the sidewalls 22, 24 of the bracket 12. In this arrangement, the straight edges 52B, 53B will overlap the ends 22A, 24A when rotation is complete. This prevents the seat 14 from over rotating within the bracket 12, which will be described below. The flares 52, 53 also allow the support flange 46 to better support the solar panel module 2.

The body 42 also includes sidewalls 54, 56 extending in a direction away from the seat surface 44. The sidewalls 54, 56 define a channel 58 therebetween. The channel 58 is located on a side of the body 42 opposite the seat surface 44. The channel 58 includes a channel surface 60 that will contact and engage with part of the claw 16 as described below. Both sidewalls 54, 56 extend a distance beyond the seat surface 44 and terminate with claw engagement portions 61, 62. Because the sidewalls 54, 56 extend a distance beyond the seat surface 44, the claw engagement portions 61, 62 are at least partially uncovered by the seat surface 44, when viewing the seat 14 in the direction of the seat surface 44. In some embodiments, the claw engagement portions 61, 62 may be fully uncovered in this direction. The claw engagement portions 61, 62 are shaped to engage with the claw 16 to help further secure the claw 16 in use. The claw engagement portions 61, 62 include bottom portions 61A, 62A, elongated mounting surfaces 61B, 62B, and claw teeth 61C, 62C. The bottom portions 61A, 62A extend generally perpendicular to the sidewalls 54, 56. Elongated mounting surfaces 61B, 62B extend from the bottom portions 61A, 62A and parallel to the sidewalls 54, 56. Claw teeth 61C, 62C extend upward from a portion of the elongated mounting surfaces 61B, 62B. Each claw tooth 61C, 62C and their respective elongated mounting surface 61B, 62B define an angled surface where the claw 16 can be engaged on or between these two elements. The elongated mounting surfaces 61B, 62B and the claw teeth 61C, 62C are arranged to contact the claw 16 in such a manner so that the claw 16 remains engaged with the seat 14 and solar panel module 2 under heavy or vibrational loads or when experiencing environmental forces like high winds.

Each sidewall 54, 56 defines an aperture 64A, 64B. Aperture 64A is defined in sidewall 54, and aperture 64B is defined in sidewall 56. The apertures 64A, 64B are positioned in the sidewalls 54, 56 such that they align with apertures 26A, 26B in the bracket 12. With this alignment, the fasteners 18A, 18B can be received through their respective apertures 26A, 26B, 64A, 64B. This allows the seat 14 to rotate about the bracket 12 in the direction of the arrows shown in FIGS. 2A and 12. The placement of the apertures 64A, 64B on the body 42 arranges the seat 14 relative to the bracket 12 such that the support flange 46 is located closer to the rounded ends 39, 41 of the bracket 12 than the fins 30A, 30B. The end of the channel 58 located farthest from the support flange 46 is located closer to the fins 30A, 30B than the rounded ends 39, 41.

Figure 9:
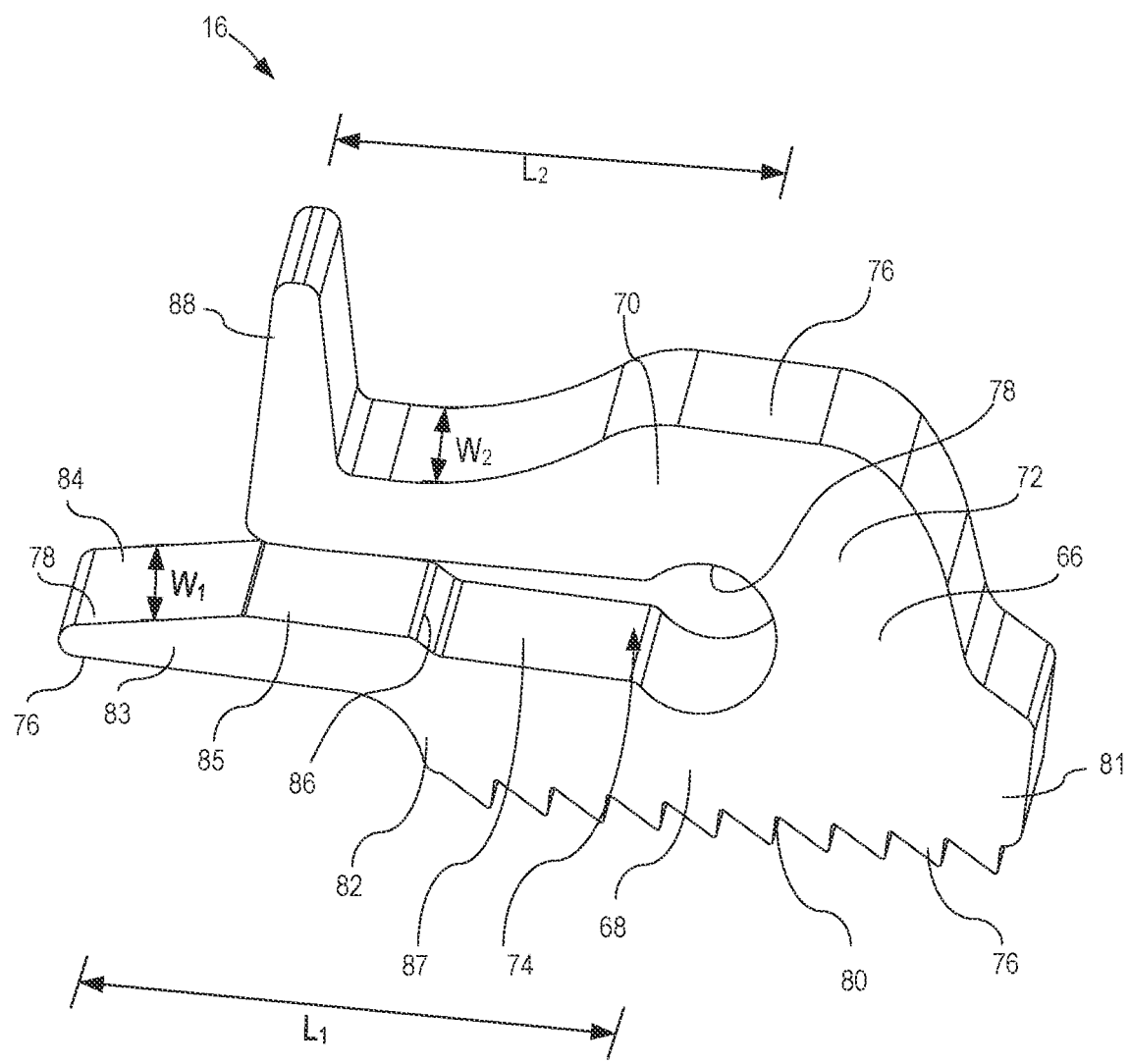
FIG. 9 is a perspective view of a cam claw of the low side attachment devices of FIG. 2.
Figure 10:
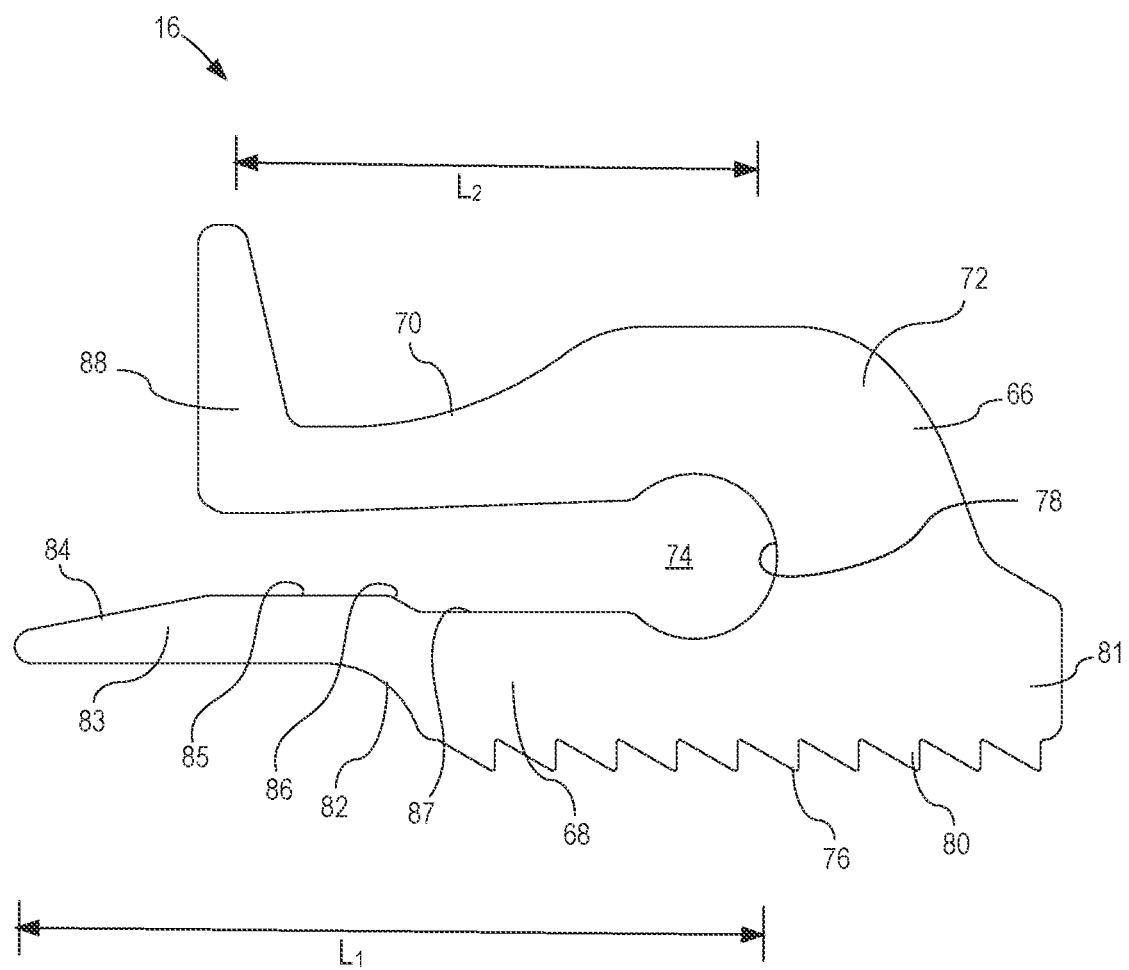
FIG. 10 is a side view of the cam claw of FIG. 9.
Figure 11:
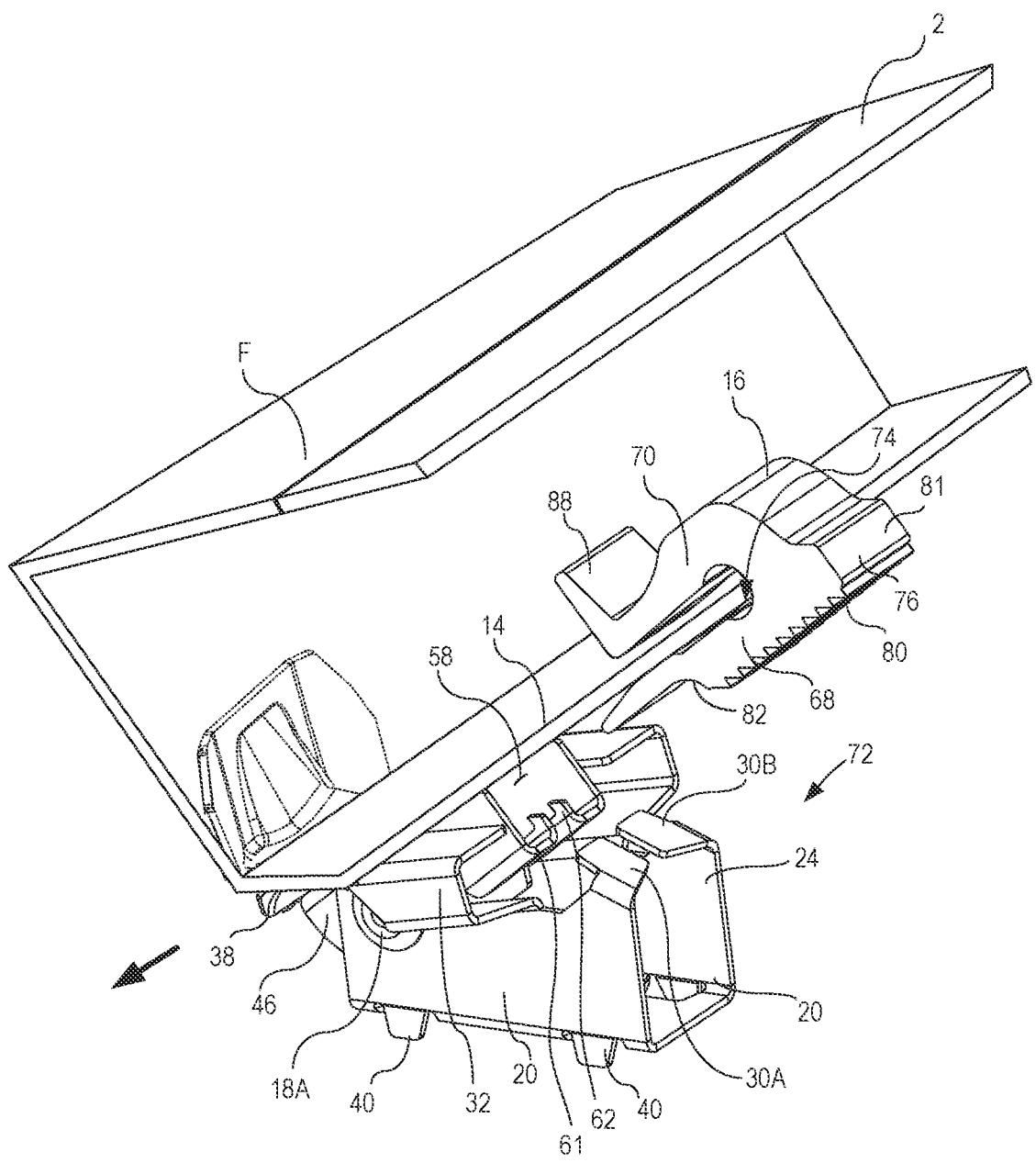
FIG. 11 is a perspective view showing the process of mounting the solar panel module to the low side attachment devices.

With reference to FIGS. 3, 9, and 10, the claw 16 is shown. The claw 16 includes a body 66 that has a seat jaw 68 and a module jaw 70, with a rounded portion 72 connecting both jaws 68, 70. The seat jaw 68 is configured to contact and engage with the seat 14, and the module jaw 70 is configured to contact and engage with the part of the frame F that opposes the part that contacts the seat 14. The seat jaw 68 and module jaw 70 define an opening 74 that is configured to receive both the seat 14 and the frame F therein. The opening 74 is also configured so that the seat 14 and frames F of different sizes can fit within the opening 74, so that during and after rotation of the solar panel module 2, seat 14, and claw 16, the claw 16 does not fall off of or otherwise disengage with the frame F or seat 14.

The claw 16 has an outer surface 76 and an inner surface 78 opposing the outer surface 76. Both surfaces 76, 78 extend along the seat jaw 68, module jaw 70, and rounded portion 72. As shown, serrations 80 may be provided on a portion of the outer surface 76 extending along the seat jaw 68. The serrations 80 are arranged to engage with the fins 30A, 30B on the bracket 12 and the claw teeth 61C, 62C of the claw engagement portions 61, 62 on the seat 14 when the claw 16 is rotated. It is understood that the serrations 80 may not be present on the outer surface 76 of the seat jaw 68, and instead, a smooth outer surface 76 of the seat jaw 68 can contact and engage with the fins 30A, 30B and claw teeth 61C, 62C. This engagement secures the claw 16 against the seat 14 and solar panel module frame F within the low side attachment mechanism as will be discussed below. This engagement may also prevent over rotation of the solar panel module 2, seat 14, and claw 16 within the low side attachment mechanism 10 as discussed above. As shown, the serrations 80 extend along a portion of the seat jaw 68 that is closest to the rounded portion 72. The serrations 80 also extend a distance beyond the rounded portion 72, partially defining an extension 81 along the seat jaw 68. However, the serrations 80 may extend along any portion of the seat jaw 68 so long as they engage with the fins 30A, 30B and prevent over rotation of the claw 16. In some embodiments, the serrations 80 may also extend along an outer surface of the rounded portion 72.

The seat jaw 68 has a length L1. The seat jaw 68 also has a width W1 along that length L1. The length L1 and width W1 are designed so that the seat jaw 68 can fit within the channel 58 of the seat 14. The width W1 is such that the seat jaw 68 fits snugly between the sidewalls 54, 56. The seat jaw 68 is also shaped to fit within the channel 58 and to engage with portions of the seat 14, such as the claw engagement portions 61, 62. Extending from the serrated outer surface 80 in a direction opposing the extension 81 is a curved surface 82. The curved surface 82 has a radius of curvature so that, when the claw 16 is engaged with the seat 14 and frame F and each are rotated, the claw 16 does not interfere with the fasteners 18A, 18B disposed within the bracket 12 and seat 14, In other embodiments, the curved surface 82 may have a radius of curvature that allows the claw teeth 61C, 62C to extend from their respective elongated mounting surfaces 61B, 62B to contact and dig into the curved surface 82 instead of the serrations 80. This may help to secure the claw 16 against the seat 14, which helps to prevent the claw 16 from sliding away from or otherwise disengaging the frame F and the seat 14.

The seat jaw 68 includes an installation end 83 that extends linearly from the curved surface 82 and across both the outer surface 76 and the inner surface 78 of the seat jaw 68. Extending along the inner surface 78, the installation end 83 includes a first ramp 84, a contact surface 85, a second ramp 86, and a secondary surface 87. The first ramp 84 extends at an angle from the end point of the seat jaw 68 in the direction of the module jaw 70. The contact surface 85 extends substantially straight from the first ramp 84 in the direction of the extension 81. The contact surface 85 is arranged to contact the channel surface 60 when the claw 16 is engaged with the seat 14. The second ramp 86 extends at an angle from the contact surface 85 in a direction away from the module jaw 70. The secondary surface 87 extends substantially straight from the second ramp 86 in the direction of the extension 81. The secondary surface 87 terminates at the rounded inner surface 78 proximate the rounded portion 72. The angle of the first ramp 84 is one that allows the installation end 83 to be received a distance within the channel 58 that allows for the claw engaging teeth 61C, 62C to engage with the serrations 80. To facilitate installation, the contact surface 85 and secondary surface 87 extend substantially parallel to the inner surface 78 of the module jaw 70. Contact surface 85 contacts the channel surface 60 in the installed arrangement. Module jaw 70 and inner surface 78 contacts the solar panel module frame flange. Contact surface 85 and inner surface 78 are parallel.

Beginning at and extending from the rounded portion 72, the module jaw 70 has a length L2. The module jaw 70 also has a width W2 along that length L2. Length L2 is shorter than the length L1 of the seat jaw 68. In one embodiment, such as the one shown in FIG. 9, the widths W1, W2 may be the same, but in other embodiments, such as the one shown in FIG. 23, width W2 may be wider than the width W1 of the seat jaw 68. The differences in lengths L1, L2 and, if present, the differences in widths W1, W2 allows for an installer to properly align the claw 16 relative to the seat 14 and frame F when securing the frame F to the low side attachment 10. The module jaw 70 terminates at a stop 88 that extends substantially perpendicular from the module jaw 70 in a direction away from the seat jaw 68. The stop 88 also ensures that the claw 16 can only be aligned and installed in one way within the low side attachment mechanism because the stop 88 does not fit within the channel 58.

With reference to FIGS. 2A, 2B, and 11-13, the assembly of the low side attachment 10 will now be described. The fasteners 18A, 18B hold the seat 14 within the bracket 12, such that the seat 14 is rotatable within the receiving space 28. The seat 14 is rotatably connected to the bracket 12 by the fasteners 18A, 18B. The seat 14 is rotated within the receiving space 28 in the direction of the arrows shown in FIGS. 2a and 12, so that the support flange 46 is positioned downward relative to the wings 32, 34 of the bracket 12 and proximate to the support structure 4. The support flange 46 should be positioned so that a first part of the frame F can be placed against the support flange 46, contacting the angled edges 52A, 53A of the respective flares 52, 53. The angled edges 52A, 53A provide support for the frame F when it rests on the support flange 46. The arrangement of the solar panel module 2 means that a second part of the frame F will contact the seat surface 44 as the first part is placed against the angled edges 52A, 53A. As noted above, the parts of the frame F contacting the angled edges 52A, 53A and the seat surface 44 are parts of a frame F that hold the photovoltaic panel P. However, it is contemplated that other parts of the solar panel module 2 may engage with the angled edges 52A, 53A and seat surface 44 or even other parts of the support flange 46. The position of the seat 14 within the bracket 12 at this point means that the photovoltaic panel P will be extending upward relative to the bracket 12, support structure 4, and the surface on which the support structure 4 is positioned. The photovoltaic panel P will likely define an acute angle with the surface on which the support structure 4 is located in this position, but relative to the arrangement(s) the solar panel module 2 will have later in the mounting process, the photovoltaic panel P is now at its most vertical orientation relative to the features of the low side attachment 10 and the surface on which the support structure 4 is located.

After the frame F has been placed against the angled edges 52A, 53A and seat surface 44, the claw 16 is placed about the frame F and seat 14 as described above. To do this, the claw 16 is moved in the direction of the arrow shown in FIG. 11. The claw 16 is oriented so that the seat jaw 68 is aligned with the channel 58 and the module jaw 70 is aligned relative to frame F. As the claw 16 is moved in the direction of the arrow, the seat jaw 68 is received within the channel 58, so that the contact surface 85 contacts the channel surface 60, and the module jaw 70 contacts the frame F. The clearance between the opening 74 and the seat 14 and frame F secure the claw 16 about the frame F and seat 14.

Figure 12:
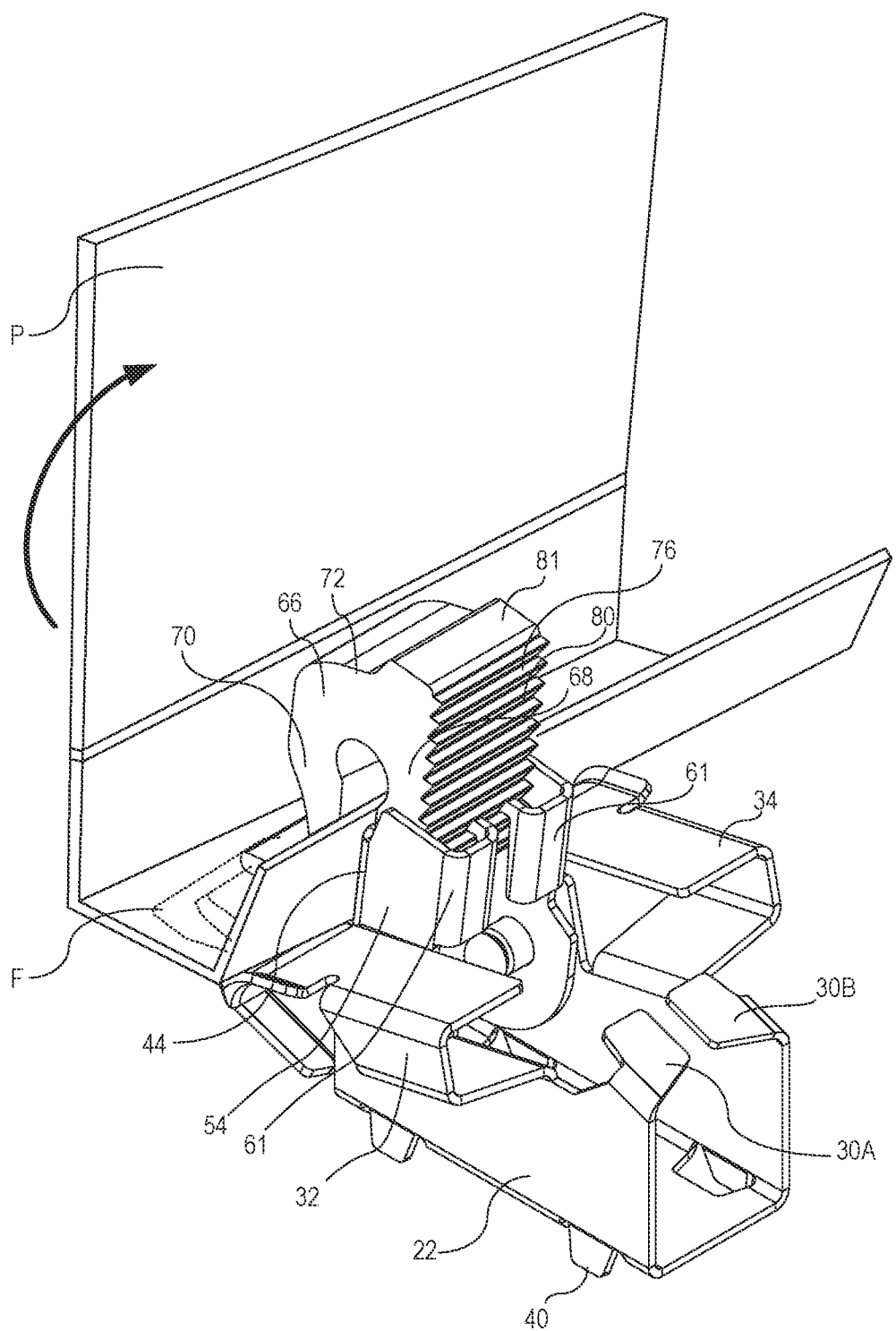
FIG. 12 is another perspective view showing the process of mounting the solar panel module to the low side attachment devices.
Figure 13:
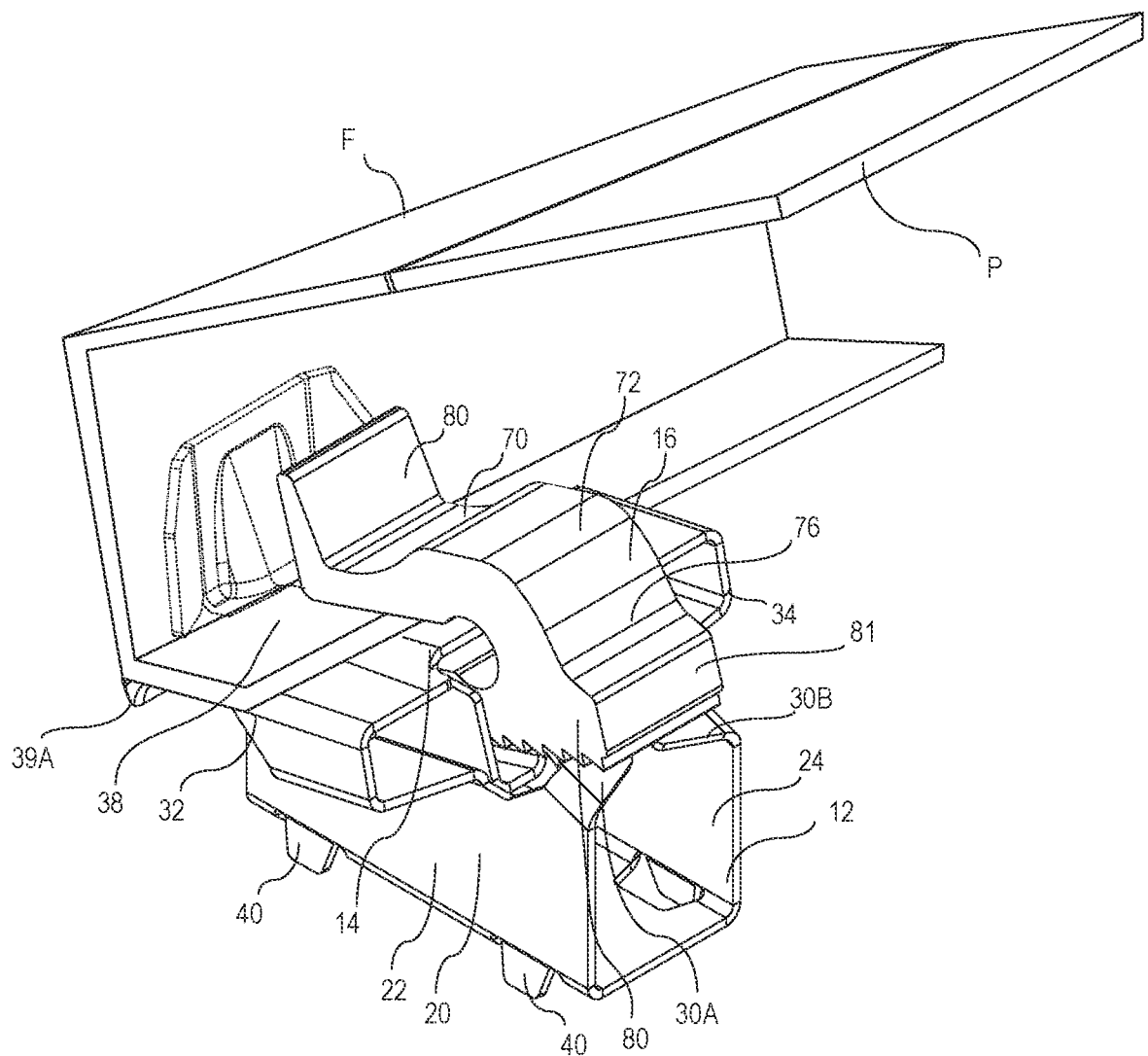
FIG. 13 is a final perspective view showing the process of mounting the solar panel module to the low side attachment devices.

From this position, the solar panel module 2, seat 14, and claw 16 can be rotated in the direction of the arrow shown in FIGS. 2A and 12. This rotation is facilitated by the seat 14 being connected to the bracket 12 via the fasteners 18A, 18B. During the rotation, the solar panel frame F contacts the rounded ends 39, 41 of the support surfaces 36, 37 of the top portions 32C, 34C of the sidewalls 22, 24 of the bracket 12. The rounded ends 39, 41 act as leading contact areas for the solar panel frame F as the rotation continues to occur and more of the solar panel frame F begins to contact the support surfaces 36, 37 and the bonding teeth 38A, 38B. At the completion of the rotation, the solar panel frame F is supported by the support surfaces 36, 37 and bonding teeth 38A, 38B, applying a force to these features. The wings 32, 34 may be formed so that the support surfaces 36, 37 and the bonding teeth 38A, 38B apply a preload to the solar panel frame F. When the frame F is supported by the support surfaces 36, 37 and the bonding teeth 38A, 38B, the inner surface 78 of the module jaw 70 of the claw 16 acts downward on the frame F to further secure the frame F against the support surfaces 36, 37 and bonding teeth 38A, 38B. After rotation, the bonding teeth 38A, 38B may be located higher than the seat surface 44. This allows for the claw 16 to apply more force against the frame F, which further secures the frame F between the claw 16 and the bonding teeth 38A, 38B.

The rotation of the seat 14, frame F, and claw 16 may be stopped when the frame F is supported by the support surfaces 36, 37 and bonding teeth 38A, 38B or when the opposing end of the solar panel module 2 is mounted to the high side attachment mechanism 90. The rotation may also be stopped when the serrations 80 on the outer surface 76 of the claw 16 contact the fins 30A, 30B. These engagements stop the rotation and secure the solar panel module 2 at a desired orientation. At this point, the solar panel module 2 is considered to be secured within the low side attachment mechanism 10. The claw teeth 61C, 62C help to retain the claw 16 within the channel 58 should the claw 16 shift or move relative to the seat 18 and/or solar panel frame F. In other embodiments, the claw teeth 61C, 62C may be arranged to act on the curved surface 82 of the seat jaw 68 in this position. The arrangement of the low side attachment mechanism 10 is such that, in the event that environmental forces push the claw 16 away from the module 2 and seat 14, the claw teeth 61C, 62C will be positioned to catch the claw 16 and keep it in the secured position with the solar panel module 2 and seat 14 secured within the opening 74. The engagement between the fins 30A, 30B and the outer surface 76 and/or serrations 80 may also help to secure the claw 16 in place against environmental forces. Full attachment to the support structure does not occur until the solar panel module 2 is connected to the high side attachment mechanism 90. The high side attachment mechanism 90 will now be described.

Figure 14:
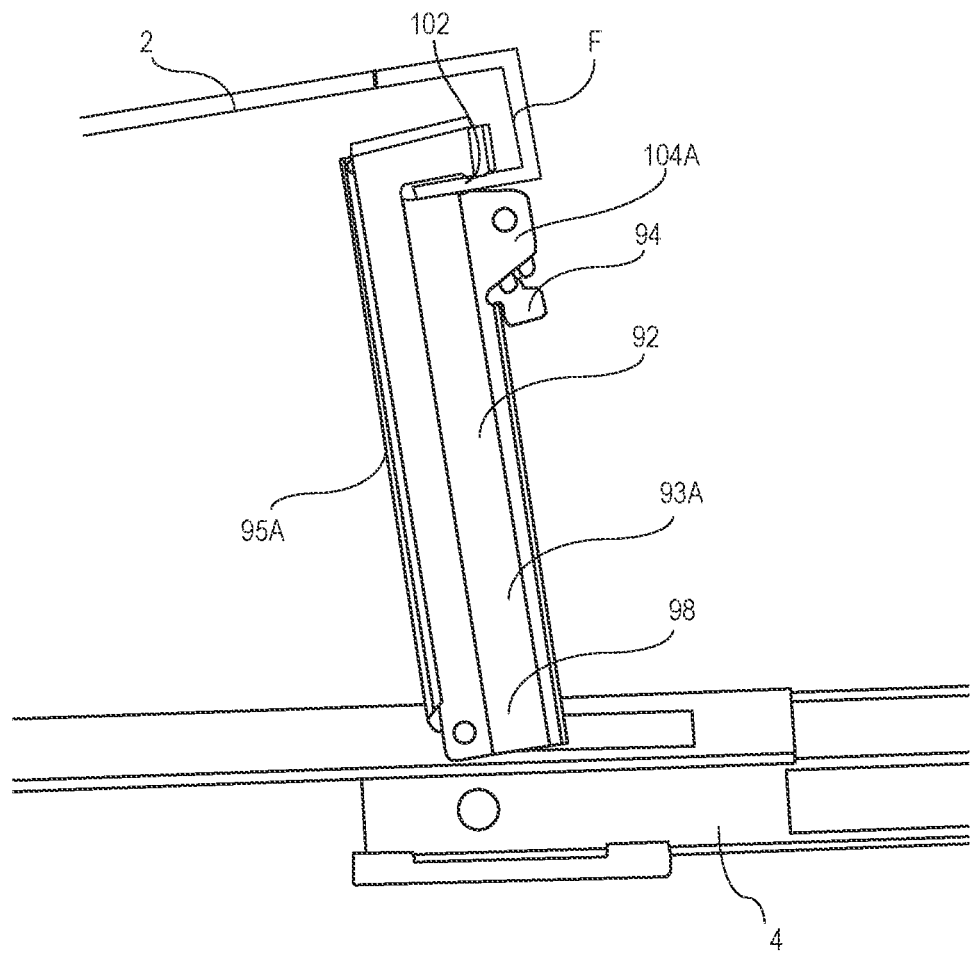
FIG. 14 is a side view of a high side attachment device shown in circle XIV-XIV in FIG. 1.
Figure 15:
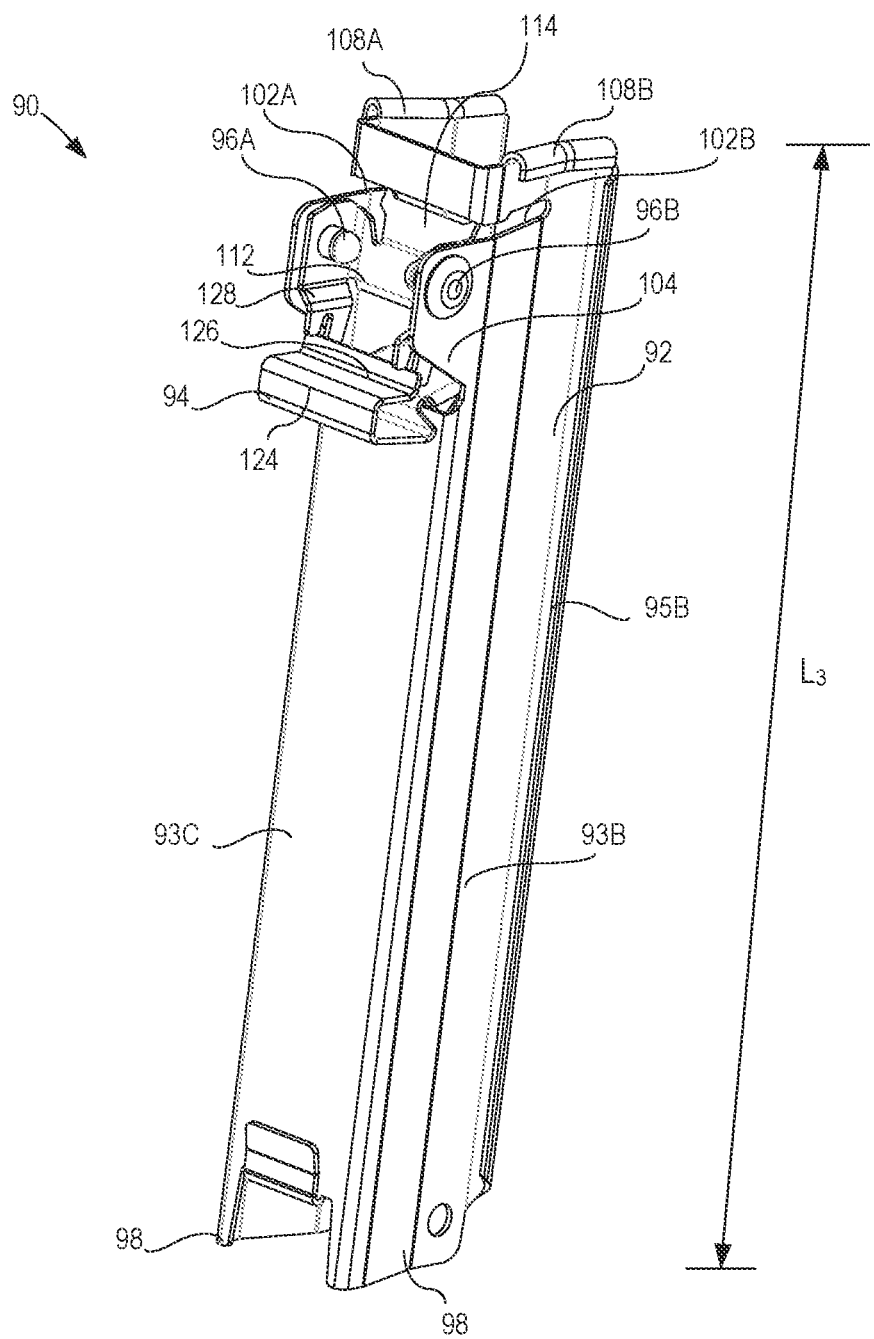
FIG. 15 is a perspective view of the high side attachment devices of FIG. 14.
Figure 16:
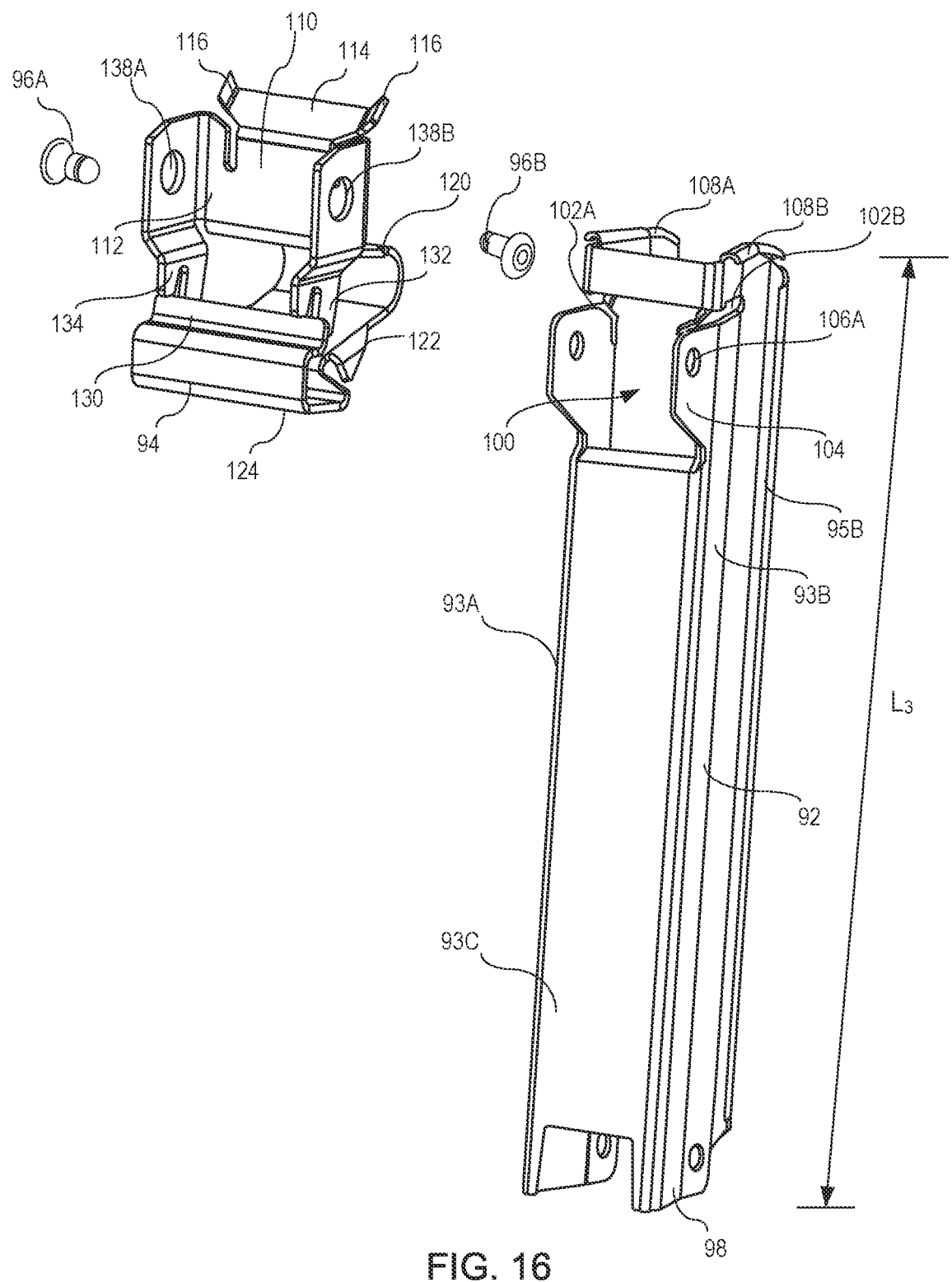
FIG. 16 is an exploded view of the high side attachment devices of FIG. 14.
Figure 17:
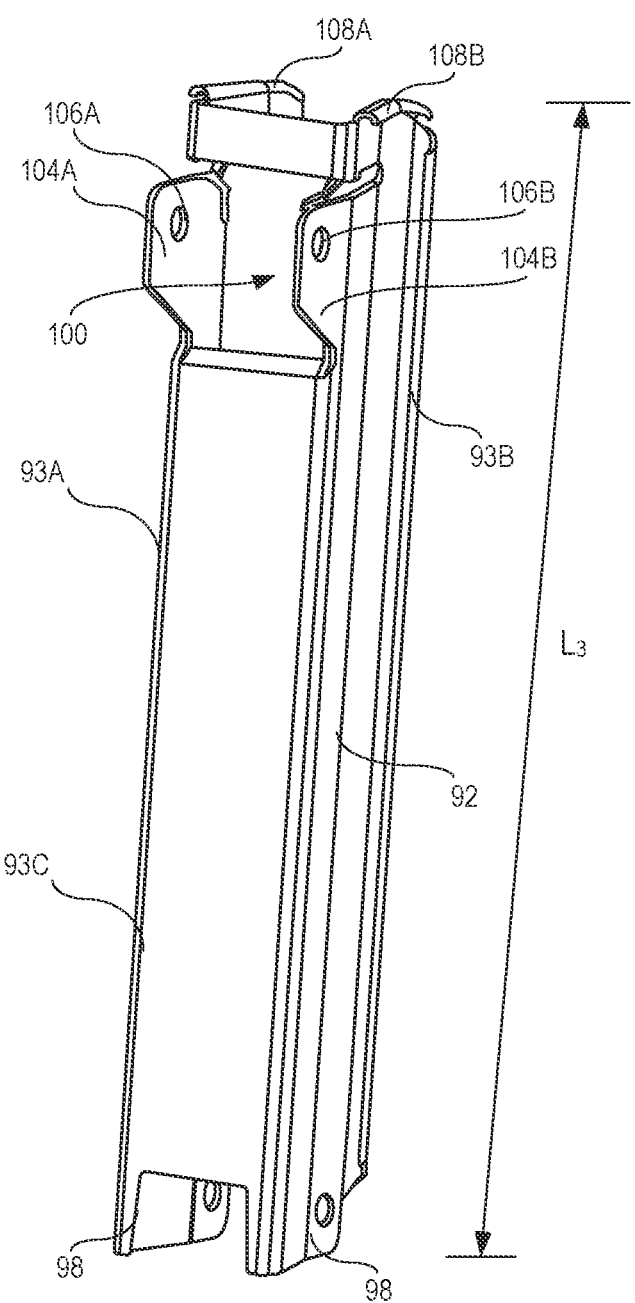
FIG. 17 is a perspective view of the tilt arm of the high side attachment devices.
Figure 18:
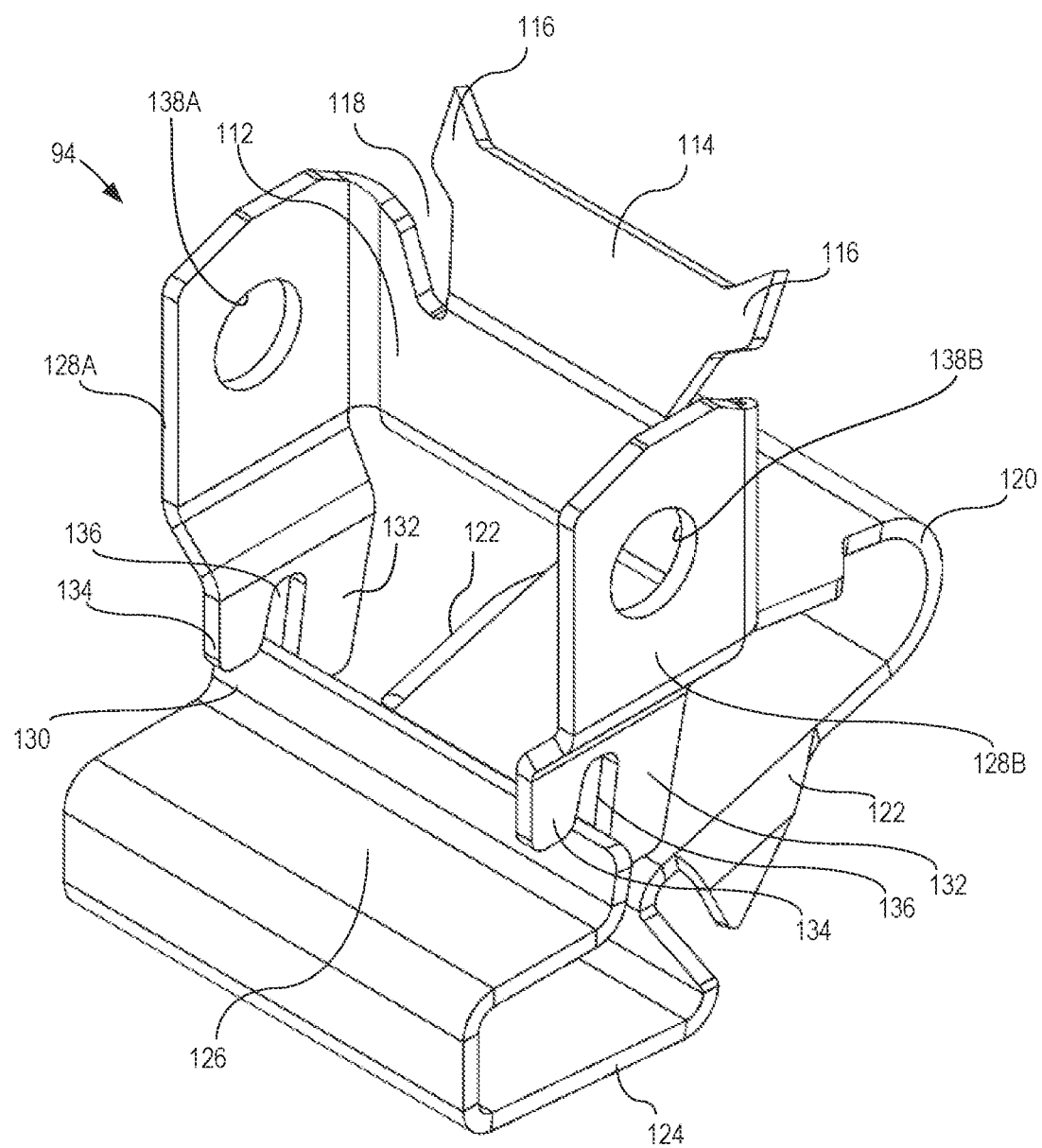
FIG. 18 is a perspective view of the bracket of the high side attachment devices.
Figure 19:
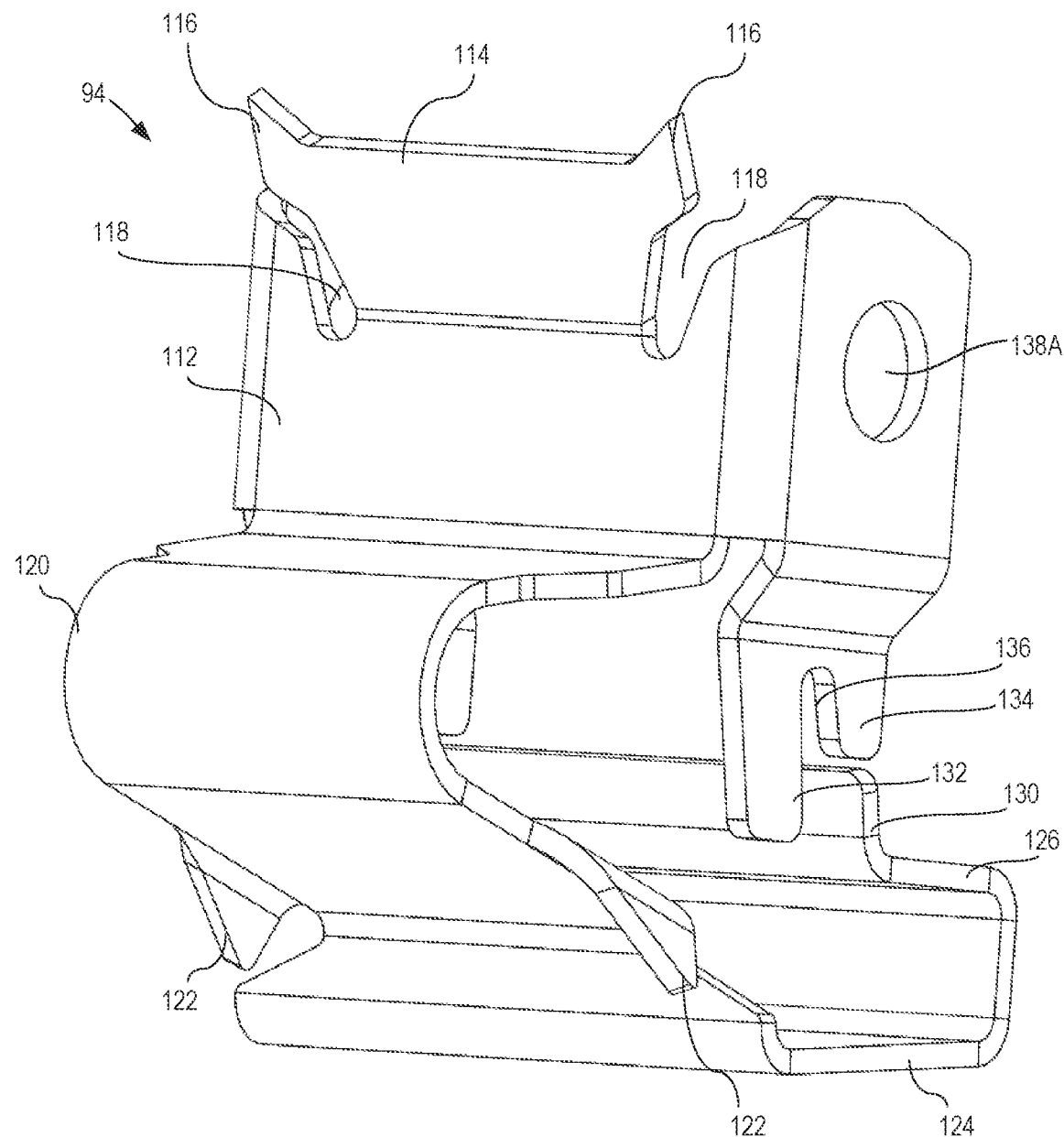
FIG. 19 is another perspective view of the bracket of the high side attachment devices.

With reference to FIGS. 14-20, the high side attachment mechanism and its associated features are shown. The high side attachment mechanism 90 includes a tilt arm 92 and a bracket 94 secured to the tilt arm via fasteners 96A, 96B. As shown, the fasteners 96A, 96B are rivets, but other fastening mechanisms such as pins, screws, or clamps may be used. With reference to FIGS. 15-17, the tilt arm 92 is shown. The tilt arm 92 includes three sidewalls 93A, 93B, 93C two of which 93A, 93B oppose each other, with sidewall 93C extending therebetweeen. The ends of the sidewalls 93A, 93B, located away from sidewall 93C, terminate with rounded ends 95A, 95B. The rounded ends 95A, 95B provide additional strength to the sidewalls 93A, 93B along the length L3 of the tilt arm 92. The tilt arm 92 also includes feet 98 that engage with the support structure 4. The feet 98 may be the same as the feet on the bracket 40, or they can be different. The feet 98 may extend from the opposing sidewalls 93A, 93B and define tabs that engage with a slot on the support structure, so that in order to connect the tilt arm 92 to the support structure 4, the tabs need to be pulled away from the support structure, after which they may be snapped back into place within the slots. Other connection methods known to those having ordinary skill in the art may also be used. The tilt arm 92 has a length L3 so that it extends a distance above the support structure 4 and above the low side attachment mechanism 10. The tilt arm 92 is also arranged at an angle relative to the support structure 4 so as to allow the solar panel module 2 to be tilted relative to the support structure 4 when the module 2 is secured to both the low and high side attachment mechanisms 10, 90. This tilt angle may correspond with the angle of the solar panel module 2 as it relates to the tilt arm 92, fins 30A, 30B, top surfaces 32C, 34C, and other bracket features 12 discussed above.

The top of the tilt arm 92 defines a receiving space 100 for receiving the bracket 94 therein. The engagement of these two features will be discussed below. Extending from the receiving space 100 are slots 102A, 102B which are defined within both of the opposing sidewalls 93A, 93B. The slots 102A, 102B are arranged to receive the solar panel module 2 and part of the bracket 94 to secure the solar panel module 2 to the tilt arm 92. Specifically, part of the frame F can be received within the slots 102A, 102B to connect the solar panel module 2 to the high side attachment mechanism 90. Extending from sidewalls 93A, 93B are flanges 104A, 104B. The flanges 104A, 104B define apertures 106A, 106B that will align with corresponding apertures on the bracket 94 to receive the fasteners 96A, 96B to connect the bracket 94 to the tilt arm 92. The flanges 104A, 104B and part of the sidewalls 93A, 93B defining the slots 102A, 102B are arranged to contact a bottom surface of the solar panel frame F received within the slots 102A, 102B. This allows the tilt arm 92 to support a solar panel module 2 that is covered in snow or experiencing load caused by other environmental factors. The tilt arm 92 also includes rounded top surfaces 108A, 108B at the end of the tilt arm 92 opposing the feet 98. The rounded top surfaces 108 stiffen the tilt arm 92 proximate the slots 102 to provide additional strength and load bearing forces for the tilt arm 92. In particular, the sidewalls 93A, 93B are stiffened to support loads that may be applied to the solar panel module 2 and act on the tilt arm 92. This underside may be another part of the frame F, the photovoltaic panel P, or another support surface that is a part of the solar panel module 2.

With reference to FIGS. 15, 16, 18, and 19 the bracket 94 is shown. The bracket 94 includes a body 110. The body 110 has a back 112 and a retaining portion 114 extending upward from the back 112. The retaining portion 114 includes retaining teeth 116 extending in an upward direction. The body 110 is shaped to fit within the receiving space 100 such that the retaining teeth 116 at least partially extend into a space parallel with the slots 102A, 102B, so that the retaining teeth 116 contact the frame F. The teeth 116 bite into the frame F to help secure frame F within the slot 102 and the tilt arm 92 more generally. Only two retaining teeth 116 are shown in the figures, but it is understood that one or multiple retaining teeth 116 may be applied along the retaining portion 114 to engage with the frame F. The retaining portion 114 may be angled relative to the back 112, so that it does not extend perfectly vertically therefrom. The angle may help the retaining teeth 116 extend into the frame F and provide additional support against loads bearing down on the solar panel module 2. The retaining portion 114 defines gaps 118 with the back 112 at opposing ends of the retaining portion 114. These gaps 118 allow for the retaining portion 114 to flex when applied to a solar panel module 2 and when experiencing loads bearing down on the module 2. The retaining portion 114 may also flex when the bracket 94 is manipulated for removal of the solar panel module 2, which will be discussed below.

Extending from the back 112 in a direction toward the receiving space 100 is a rounded portion 120. The rounded portion 120 curves into the receiving space 100 and then back out of the receiving space 100 when the bracket 94 is connected to the tilt arm 92. The rounded portion 120 also allows for the bracket 94 to bend under loads. Locking teeth 122 extend from sides of the rounded portion 120 as it returns toward the exterior of the tilt arm receiving space 100. The locking teeth 122 are tapered and may be used to lock the bracket 94 into the fixed position in the receiving space when the solar panel frame F flange portion is extended into the slots 102A, 102B. As will be described below, the locking teeth 122 may be disengaged from the tilt arm 92 upon an action created by a user against a folded portion 124. Extending from the rounded portion 120 proximate the locking teeth 122 is the folded portion 124 of the body 112. The folded portion 124 is folded over itself and terminates with a stopper 126. As shown, the folded portion 124 extends downwards and partially backwards in the direction of the rounded portion 120 before bending and extending in a straight line in a direction away from the rounded portion 120. Then, the folded portion 124 extends upwards in the direction of the apertures 138A, 138B and then bends again to extend in the direction of the rounded portion 120 before finally extending upwards again in the direction of the apertures 138A, 138B, terminating with the stopper 126. The stopper 126 is arranged to contact flanges 128 extending from opposing sides of the back 112 to allow for the removal of the solar panel module 2 from the slots 102A, 102B, which will be discussed below. This contact prevents the bracket 94 from being damaged during removal of the solar panel module 2. The shape of the folded portion 124 allows for it to bend in such a manner that the stopper 126 contacts the flanges 128A, 128B, which stops the bending of the folded portion 124 during removal of the locking teeth from the interior of the tilt arm 92. The stopper 126 includes an action tab 130 that is shaped to contact the flanges 128. The notches 136 and tabs 132, 134 are sized to allow room for the folded portion 124 to move upward and the rounded portion 120 to flex enough to move the locking teeth 122 above the sidewall 93C thereby releasing the bracket 94 from the locked position thus allowing the rotation of the bracket around the fasteners 96A, 96B and within the receiving space 100 of the tilt arm 92. The rotation of the bracket allows the retaining teeth 116 to again move below the slots 102A, 102B and the frame F to be removed from the high side attachment mechanism 90.

The flanges 128 have tabs 132, 134 that define notches 136 therebetween. Each flange 128 has a long tab 132 and a short tab 134 that extend in the same direction, with the long tab 132 extending farther than the short tab 134. The notches 136 can receive the action tab 130 therein. The action tab 130 contacts the long tab 132 when received within the notches 136, thereby limiting the movement of the stopper 126 and folded portion 124. The flanges also define apertures 138A, 138B that align with apertures 106A 106B on the tilt arm 92 to receive the fasteners 96A, 96B to rotatably connect the features.

Figure 20:
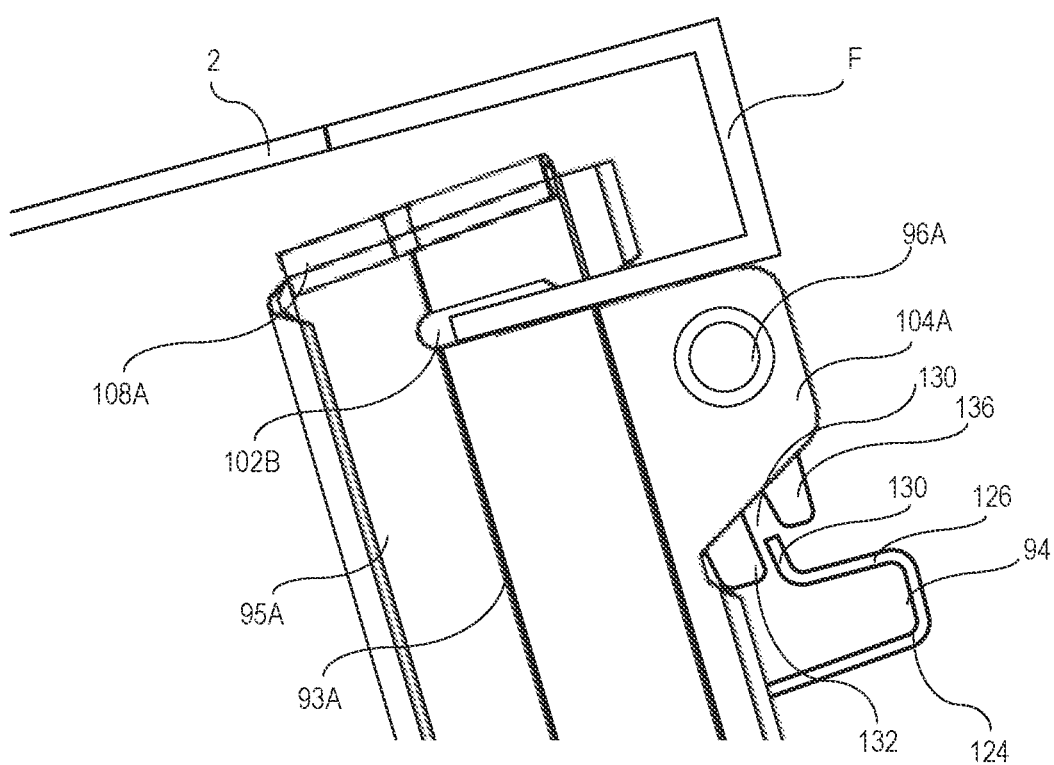
FIG. 20 is a side view showing the mounting of a solar panel module to the high side attachment devices.

With reference to FIGS. 14, 15, and 20, the assembly of the high side attachment mechanism 90 will now be described. The bracket 94 is aligned within the receiving space 100, so that the apertures 138A, 138B are aligned with the apertures 106A, 106B of the tilt arm 92. Then, the fasteners 96A, 96B are applied through their respective pairs of apertures 106A, 96A, 106B, 96B. The arrangement of the apertures 96A, 96B, 106A, 106B is such that the bracket 94 is always partially within the receiving space 100 and is able to swivel or rotate around the fasteners 96A, 96B. Before installation of the solar panel module 2, the bracket 94 can be rotated outward from the receiving space 100, such that the locking teeth 122 are exterior of the receiving space 100 and on the outside of sidewall 93C. In this position, the bracket 94, and the high side attachment mechanism, more generally, is considered to be in the disengaged position. This arranges the retaining teeth 116 below the slots 102A, 102B. After the solar panel module 2 is connected to the low side attachment mechanism 10 and the module 2 is rotated to its desired tilt angle, the module 2 can be engaged with the high side attachment mechanism 90. This can be done by rotating the tilt arm 92 such that the slots 102A, 102B can slide around and envelop the frame F therein, or by sliding the frame F into the slots 102A, 102B. From here, the bracket 94 can be rotated within the receiving space 100 by pressing or pushing on the folded portion 124. As the bracket 94 rotates, the tapered side of the locking teeth 122 contacts the top edge of sidewall 93C pushing the folded portion 124 and the teeth upward until the greatest height of the locking teeth 122 pass over the sidewall 93C and the folded portion snaps downward extending the locking teeth 122 into the receiving space and behind the sidewall 93C thus preventing the reverse rotation of the bracket 94 in relation to the tilt arm 92 and locking the bracket in the engaged position. The rotation allows the retaining teeth 116 to extend into a space parallel to the slots 102A, 102B to engage the frame F by biting into the bottom of the solar panel frame F. The frame F is supported by the sidewalls 93A, 93B within the slots 102A, 102B. The frame F can be received within the slots 102A, 102B. In this position, the bracket 94, and the high side attachment mechanism, more generally, is considered to be in the engaged position. To disengage the module 2 from the high side attachment mechanism 90, the folded portion 124 is pulled upwards opposite the direction of the support structure 4. This releases the locking teeth 122 allowing the bracket 94 to rotate and the retaining teeth 116 to move downward and away from the solar panel module 2. This allows the module 2 to be slid out of the receiving space 100 and slots 102A, 102B.

To remove the solar panel frame F from the receiving space 100 and slots 102A, 102B, the bottom of the folded portion 124 is pushed upwards, so that the action tab 130 slides into the notches 136 and contacts the long tab 132. This imparts a rotational force on the bracket 94 that disengages the locking teeth 122 from the side 93C of the tilt arm 92. Because the locking teeth 122 are disengaged from the side 93C, the bracket 94 can rotate further, so that the retaining teeth 116 disengage from the solar panel frame F. This disengagement allows a user to remove the solar panel frame F from the tilt arm 92. The arrangement of the notches 136 and long tabs 132 relative to the action tab 130 and folded portion 124 helps to prevent over rotation of the folded portion 124 and the bracket 94 more generally. Contact between the action tab 130 and the long tabs 132 signals to a user that the folded portion 124 has been sufficiently rotated to disengage the locking teeth 122 from the sides 93A, 93B and the retaining teeth 116 from the solar panel frame F. This allows the folded portion 124 and bracket 94 to maintain their shape after repeated actions, thereby prolonging the lifespan of the bracket 94.

With reference to FIGS. 21-24, additional embodiments of the seat 1014 and claw 1016 are shown. The seat 1014 and claw 1016 engage with each other, the solar panel frame F, and a bracket in a manner similar to the seat 14 and claw 16 discussed above. The seat 1014 and the claw 1016 can be used with the same solar panel frame F and bracket 12 as the seat 14 and the claw 16. Relative to the seat 14 and the claw 16, the different features of the seat 1014 and claw 1016 will now be described.

Figure 21:
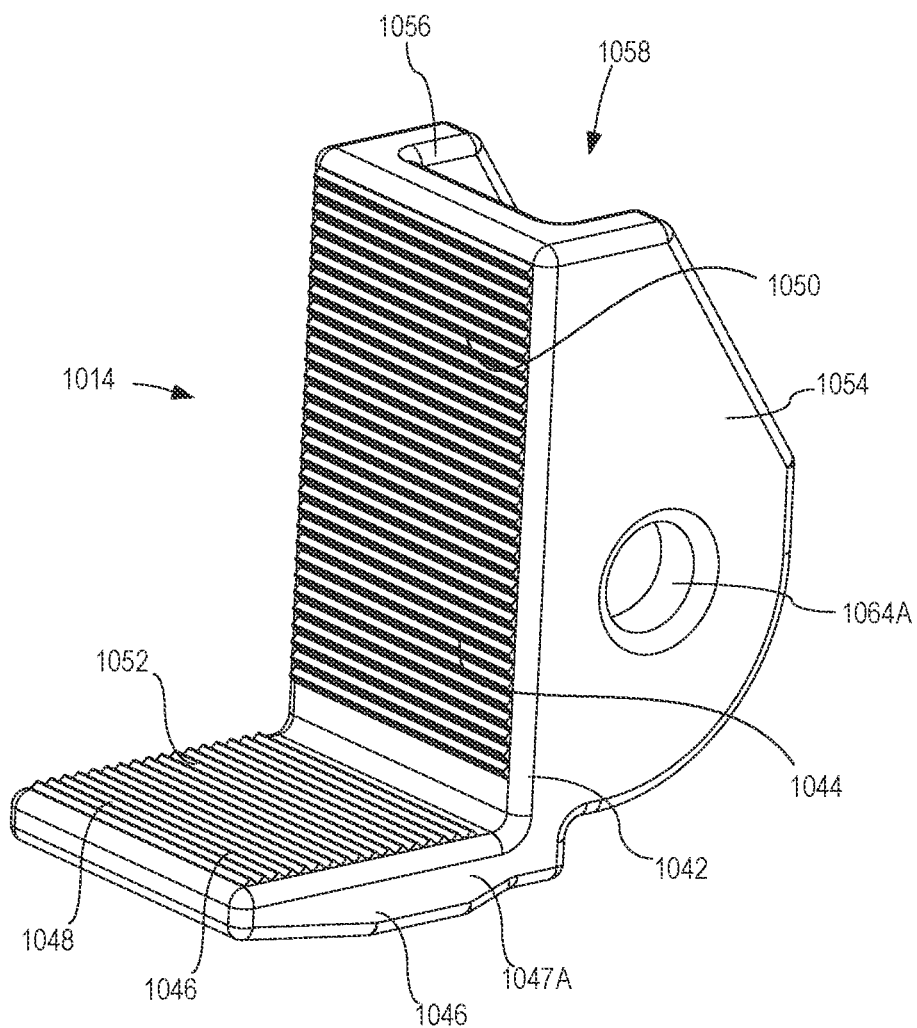
FIG. 21 is a perspective view of a seat according to another embodiment of the present disclosure.
Figure 22:
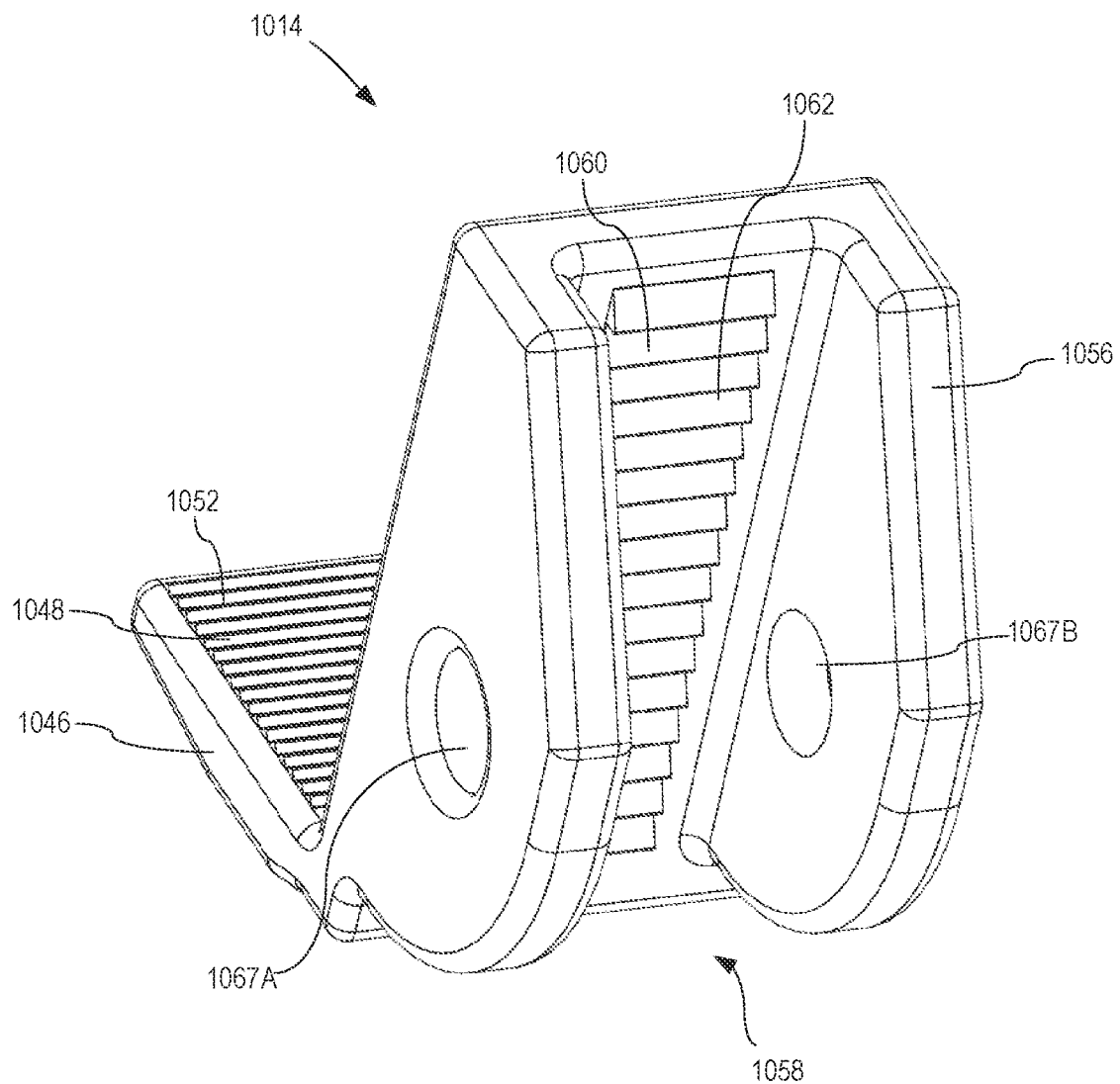
FIG. 22 is another perspective view of the seat of FIG. 21.

With reference to FIGS. 21 and 22, the seat 1014 is shown. The seat 1014 includes a body 1042 that has a seat surface 1044 and a support flange 1046 extending from an end of the body 1042. The seat surface 1044 is configured to contact and engage the frame F of the solar panel module 2. The support flange 1046 defines a secondary seat surface 1048 that also contacts and engages with a portion of the frame F. To further secure the frame F to the seat 1014, the seat surface 1044 includes serrations 1050, extending along at least a portion thereof. The serrations 1050 may extend over the entirety of the seat surface 1044 as shown in FIG. 21. The secondary seat surface 1048 also includes serrations 1052 that may extend over a portion or the entirety thereof. The serrations 1050, 1052 are arranged to dig into the frame F when it rests on the seat surfaces 1044, 1048. This means the serrations 1050, 1052 may be angled relative to their respective surface 1044, 1048 in order to create additional friction on the frame F.

The body 1042 also includes sidewalls 1054, 1056 extending in a direction away from the seat surface 1044. The sidewalls 1054, 1056 define a channel 1058 therebetween. The channel 1058 is located on a side of the body 1042 opposite the seat surface 1044. The channel 1058 includes a channel surface 1060 that will contact and engage with part of the claw 1016 as described below. The channel surface 1060 also includes serrations 1062 that will help the claw 1016 engage with the channel surface 1060. Like serrations 1050, 1052, the serrations 1062 of the channel surface 1060 can be angled in such a way to prevent movement of the claw 1016 relative to the channel surface 1060 and seat 1014. The support flange 1046 includes tabs 1047A, 1047B that extend away from the secondary seat surface 1048. The tabs 1047A, 1047B provide support for the support flange 1046 so that the support flange 1046 is not damaged during placement of the solar panel module 2 thereon. Each sidewall 1054, 1056 defines an aperture 1064A, 1064B to receive fasteners to secure the seat 1014 to a bracket 12.

Figure 23:
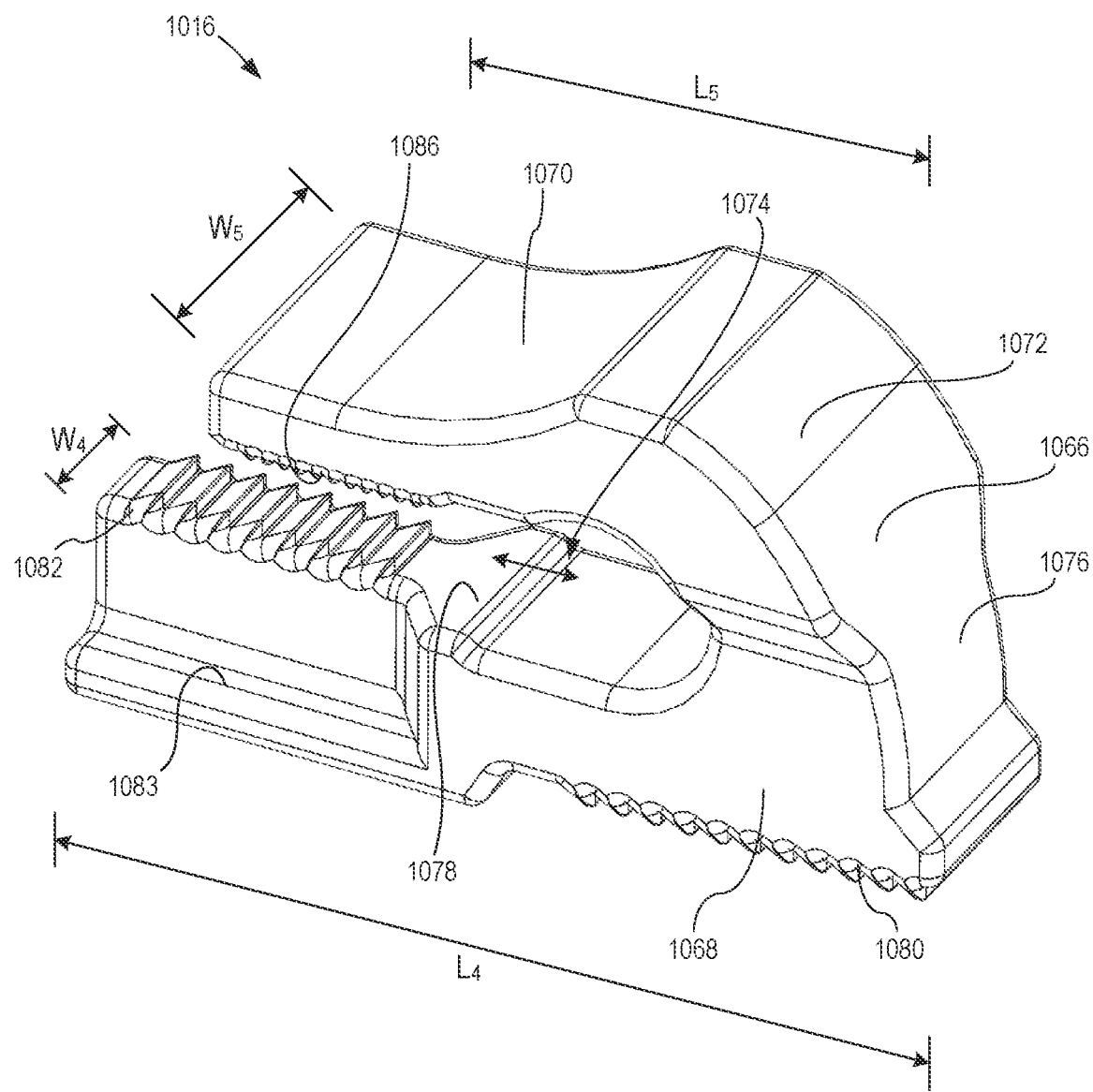
FIG. 23 is a perspective view of a claw according to another embodiment or aspect of the present disclosure.
Figure 24:
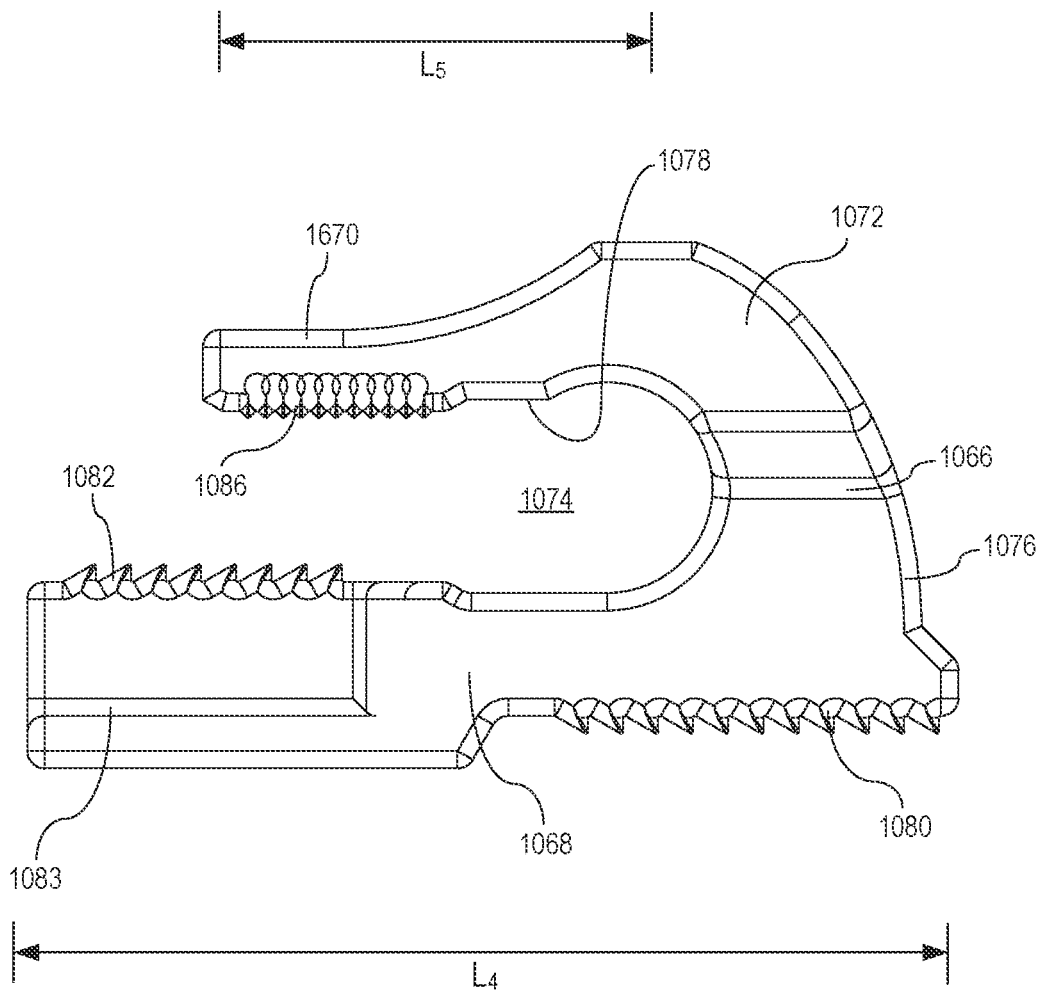
FIG. 24 is a side view of the claw of FIG. 23.

With reference to FIGS. 23 and 24, the claw 1016 is shown. The claw 1016 includes a body 1066 that has a seat jaw 1068 and a module jaw 1070, with a rounded portion 1072 connecting both jaws 1068, 1070. The seat jaw 1068 is configured to contact and engage with the seat 1014, and the module jaw 1070 is configured to contact and engage with the part of the solar panel frame F that engages the seat 1014. The seat jaw 1068 and module jaw 1070 define an opening 1074 that is configured to receive both the seat 1014 and the solar panel frame F therein. The opening 1074 is also configured so that the solar panel frame F and the seat 1014 fit within the opening 1074, so that during rotation of the solar panel module 2, seat 1014, and claw 1016, the claw 1016 does not fall off of or otherwise disengage with the solar panel module 2 or seat 14.

The claw 1016 has an outer surface 1076 and an inner surface 1078 opposing the outer surface 1076. Both surfaces 1076, 1078 extend along the seat jaw 1068, module jaw 1070, and rounded portion 1072. Serrations 1080 are provided on a portion of the outer surface 1076 extending along the seat jaw 1068. The serrations 1080 are arranged to engage with the fins 30A, 30B on the bracket 12 when the claw 1016 is rotated. This engagement further secures the claw 1016 within the low side attachment mechanism as discussed above in connection with the first embodiment. This engagement may also prevent some over rotation of the claw 1016. As shown, the serrations 1080 extend along a portion of the seat jaw 1068 that is closest to the rounded portion 1072. However, the serrations 1080 may extend along any portion of the seat jaw 1068 so long as they engage with the fins 30A. 30B and prevent over rotation of the claw 16.

Relative to the rounded portion 1072, the seat jaw 1068 has a length L4. The seat jaw 1068 also has a width W4 along that length L4. The length L4 and width W4 are designed so that the seat jaw 1068 can fit within the channel 1058 of the seat 1014. The width W1 is such that the seat jaw 1068 fits snugly within the channel 1058. At least a portion of the inner surface 1078 of the seat 1068 also includes serrations 1082 to engage with the serrations 1062 on the channel surface 1060. These serrations 1082, 1062 help engage the seat jaw 1068 with the channel surface 1060 and prevent movement between the claw 1016 and seat 1014 during rotation of both features. The seat jaw 1068 includes a step 1083 around the serrations 1082, so that the width of the serrated inner surface 1078 is less than the width W1 of the seat jaw 1068. This allows for less materials to be used when making the claw 16 but still allows for the seat jaw 1068 to properly engage with the channel surface 1060.

Relative to the rounded portion 1072, the module jaw 1070 has a length L5. The module jaw 1070 also has a width W5 along that length L2. Length L5 is shorter than the length L4 of the seat jaw 1068, but width W5 is wider than the width W4 of the seat jaw 1068. The differences in lengths L4, L5 and widths W4, W5 allows for an installer to properly align the claw 1016 relative to the seat 1014 when securing the solar panel module 2 to the low side attachment. At least a portion of the inner surface 1078 of the module jaw 1070 includes serrations 1086. The serrations 1086 are configured to engage with the part of the solar panel module 2 to secure the module jaw 1070 against the solar panel module 2 during and after rotation.

While specific embodiments of the devices of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. An attachment mechanism for securing a solar panel module to a support structure, the attachment mechanism comprising:
    a bracket coupled to a portion of the support structure, the bracket comprising: opposing sidewalls, defining a space therebetween; and
    at least one wing, the at least one wing comprising a first portion extending from a first sidewall and a second portion extending from the first portion and at least partially overlapping the first portion;
    a seat rotatably coupled with the bracket and configured to support at least a portion of the solar panel module thereon; and
    a claw defining an opening,
    wherein the opening is configured to receive the seat and at least a portion of the solar panel module therein,
    wherein the claw, the seat, and the at least a portion of the solar panel module supported by the seat are rotatable about the bracket,
    wherein the space is configured to receive the claw and the seat,
    wherein, upon rotation, the second portion is configured to support the solar panel module thereon.

2. The attachment mechanism of claim 1, wherein the at least one wing extends from the body such that the second portion is folded over the first portion.

3. The attachment mechanism of claim 1, wherein the second portion comprises a rounded leading edge.

4. The attachment mechanism of claim 1, wherein the second portion comprises a bonding tooth, the bonding tooth configured to create an electrical connection with the at least a portion of the solar panel module.

5. The attachment mechanism of claim 1, wherein the at least one wing comprises two wings, a first wing extending from the first sidewall and a second wing extending from the second sidewall.

6. The attachment mechanism of claim 1, wherein the bracket further comprises at least one fin, and
    wherein the claw comprises:
        an inner surface defining the opening; and
        an outer surface opposing the inner surface, and
    wherein upon rotation, the outer surface of the claw is configured to engage with the at least one fin to secure the claw, the seat, and the at least a portion of the solar panel module supported by the seat in a mounted position.

7. The attachment mechanism of claim 6, wherein at least a portion of the outer surface is serrated, and upon rotation, the serrated portion of the outer surface is configured to engage with the at least one fin.

8. The attachment mechanism of claim 6, wherein the claw further comprises a seat jaw, configured to engage with the seat, and a module jaw opposing the seat jaw, the module jaw configured to engage with the at least a portion of the solar panel module, and
    wherein the seat jaw and the module jaw define the opening.

9. The attachment mechanism of claim 8, wherein the module jaw and the seat jaw both have a length, extending in a first direction, the length of the seat jaw being longer than the length of the module jaw.

10. The attachment mechanism of claim 9, wherein the module jaw and the seat jaw both have a width, extending in a second direction perpendicular to the first direction, the width of the module jaw being wider than the width of the seat jaw.

11. The attachment mechanism of claim 1, wherein the seat comprises a support flange extending from the seat surface and configured to support at least another portion of the solar panel module.

12. The attachment mechanism of claim 1, wherein the seat comprises a channel extending from the seat surface, the channel configured to receive a portion of the claw therein.

13. The attachment mechanism of claim 8, wherein the channel comprises a channel surface configured to contact the portion of the claw received within the channel.

14. The attachment mechanism of claim 1, further comprising at least one fastener, wherein the bracket and the seat both define corresponding apertures configured to receive the at least one fastener, and the claw, the seat, and the at least a portion of the solar panel area configured to rotate about the at least one fastener.

15. The attachment mechanism of claim 1, wherein the bracket comprises at least one mounting foot extending from the body, the at least one mounting foot being configured to secure the bracket to the support structure.

16. An attachment mechanism for securing a solar panel module to a support structure, the attachment mechanism comprising:
    a bracket coupled to a portion of the support structure, the bracket comprising: opposing sidewalls defining a space therebetween; and
        at least one wing, the at least one wing comprising a first portion extending from a first sidewall and a second portion extending from the first portion and at least partially overlapping the first portion;
    a seat rotatably coupled with the bracket and configured to support at least a portion of the solar panel module thereon; and
    a claw comprising:
        a seat jaw;
        a module jaw opposing the seat jaw and defining an opening therebetween; an inner surface; and
        an outer surface opposing the inner surface,
    wherein the seat jaw is configured to contact the seat and the module jaw is configured to contact the at least a portion of the solar panel module, thereby securing the seat and the at least a portion of the solar panel module within the opening,
    wherein the claw, the seat, and the at least a portion of the solar panel module are rotatable about the bracket, and
    wherein, upon rotation, the second portion of the at least one wing is configured to support the solar panel module thereon.

17. The attachment mechanism of claim 16, wherein the at least one wing extends from the body such that the second portion is folded over the first portion.

18. The attachment mechanism of claim 16, wherein the second portion of the at least one wing comprises a rounded leading edge.

19. The attachment mechanism of claim 16, wherein the second portion of the at least one wing comprises a bonding tooth configured to create an electrical connection with the at least a portion of the solar panel module.

20. The attachment mechanism of claim 16, wherein the at least one wing comprises two wings, a first wing extending from the first sidewall and a second wing extending from the second sidewall.

\* \* \* \* \*